US007034089B2

(12) United States Patent
Herr et al.

(10) Patent No.: US 7,034,089 B2

(45) Date of Patent: Apr. 25, 2006

(54) EPOXY-FUNCTIONAL HYBRID COPOLYMERS

(75) Inventors: Donald E. Herr, Doylestown, PA (US); Sharon Chaplinsky, Ringoes, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 108 days.

(21) Appl. No.: 10/327,353

(22) Filed: Dec. 20, 2002

(65) Prior Publication Data

US 2004/0122186 A1 Jun. 24, 2004

(51) Int. Cl.
*C08L 83/04* (2006.01)

(52) U.S. Cl. .......................... 525/479; 528/31; 528/25; 549/215

(58) Field of Classification Search ................ 525/479; 528/31, 25; 549/215

See application file for complete search history.

(56) References Cited

U.S. PATENT DOCUMENTS

| | | | |
|---|---|---|---|
| 2,946,701 | A | 7/1960 | Plueddemann |
| 2,970,150 | A | 1/1961 | Bailey |
| 2,997,458 | A | 8/1961 | Lewis |
| 4,150,048 | A | 4/1979 | Schilling, Jr. et al. |
| 4,587,276 | A | 5/1986 | Lien et al. |
| 5,037,861 | A | 8/1991 | Crivello et al. |
| 5,169,962 | A | 12/1992 | Crivello et al. |
| 5,227,410 | A | 7/1993 | Eckberg et al. |
| 5,260,399 | A | 11/1993 | Crivello et al. |
| 5,378,790 | A | 1/1995 | Michalczyk et al. |
| 5,442,026 | A | 8/1995 | Crivello et al. |
| 5,484,950 | A | 1/1996 | Crivello et al. |
| 5,677,410 | A | 10/1997 | Mager et al. |
| 6,184,313 | B1 | 2/2001 | Roovers et al. |
| 6,184,407 | B1 | 2/2001 | Yoshitake et al. |
| 6,306,992 | B1 | 10/2001 | Yoshitake et al. |
| 6,476,174 | B1 | 11/2002 | Lee et al. |

OTHER PUBLICATIONS

Matejka, Libor et al.: "Block Copolymer Organic—Inorganic Networks. Formation and Structure Ordering"; Amer. Chem. Society 2003; 7977-7985.

Matejka, Libor: "Structure Characterization Of Organic-Inorganic Nanocomposites Formed By The Sol-Gel Polycondensation"; Mat. Res. Soc. Symp. Proc. vol. 726; 58-62.

Matejka, Libor et al.: "Cage-like structure formation during sol-gel polymerization of glycidyloxypropyltrimethoxysilane"; Journal of Non-Crystalline Solids 270 (2000) 34-47.

Plueddemann, E. P. et al.: "Epoxyorganosiloxanes"; J. Am. Chem. Soc., 1959; 81; 2632-2635.

Morikawa, A. et al.: "Convergent Synthesis of Siloxane Starburst Dendrons and Dendrimers via Hydrosilylation"; Macromolecules 1992; 25; 3247-3253.

Dvornic, P. R. et al.: "Polymerization by Hydrosilation. I. Preparation of Poly[1,1,3,3-tetramethyldisiloxanyl) ethylene]"; A Preliminary Report; Macromolecules 1994, 27, 1068-1070.

Crivello, J. V. et al.: "Regioselective Hydrosilations. I. The Hydrosilation of a,w-Dihydrogen Functional Oligopolydimethylsiloxanes with 3-Vinyl-7-oxabicyclo[4.1.0]heptane"; Journal of Polymer Science: Part A: Polymer Chemistry, vol. 31, 2563-2572 (1993).

Crivello, J. V. et al.: "Regioselective Hydrosilations. II. The Synthesis of Silicon-Hydrogen Functional Compounds"; Journal of Polymer Science: Part A: Polymer Chemistry, vol. 31; 2729-2737 (1993).

Crivello, J. V. et al.: "Regio Selective Hydrosilations. III. The Synthesis and Polymerization of Ambifunctional Silicon-Containing Epoxy Monomers"; Journal of Polymer Science: Part A: Polymer Chemistry; vol. 31; 3109-3119.

Crivello, J. V. et al.: "Regioselective Hydrosilations. IV. The Synthesis and Polymerization of Monomers Containing Epoxy and Alkoxysilane Groups"; Journal of Polymer Science: Part A: Polymer Chemistry; vol. 31; 3121-3132 (1993).

Crivello, J. V. et al.: "Novel Platinum-Containing Initiators for Ring-Opening Polymerizations"; Journal of Polymer Science: Part A: Polymer Chemistry; vol. 29; 1853-1863 (1991).

Crivello, J. V. et al.: "The Synthesis, Characterization, and Photoinitiated Cationic Polymerization of Silicon-Containing Epoxy Resins"; Journal of Polymer Science: Part A: Polymer Chemistry; vol. 28; 479-503 (1990).

(Continued)

*Primary Examiner*—Kuo-Liang Peng

(74) *Attorney, Agent, or Firm*—Charles W. Almer

(57) ABSTRACT

Versatile synthetic methodology has been established for the production of a variety of siloxane and silane-containing radial epoxy resins and intermediates. This chemical approach has been exploited to obtain a variety of hybrid organic/inorganic materials that can be described as epoxysiloxane or epoxysilane radial copolymers. The methodology can be used to access reactive, hydrophobic Si-containing resins with good organic compatibility that are structurally distinct from epoxy-functional siloxanes/silanes known in the prior art.

These hybrid radial epoxy resins may be utilized for a variety of adhesive and coating applications including radiation and thermally curable sealants, encapsulants and adhesives.

14 Claims, 9 Drawing Sheets

OTHER PUBLICATIONS

Crivello, J. V. et al.: "Synthesis and Polymerization of Novel Cationically Polymerizable Monomers"; J.M.S.-Pure Appl. Chem., A31(8), pp. 1001-1029 (1994).
Malik, R. et al.: "Epoxy Graft Functionalization of Poly (Butadiene)"; J.M.S.-Pure Appl. Chem., A34(2), pp. 247-263 (1997).
Zhou, L. L. et al.: "Synthesis of Novel Carbosilane Dendritic Macromolecules"; Macromolecules 1963; 26; 963-968.
Miravet, J. F. et al.: "New Hyperbranched Poly (siloxysilanes): Variation of the Branching Pattern and End-Functionalization"; Macromolecules 1998; 31; 3461-3468.
Kim, C. et al.: "End-Capped $AB_3$-Type Hyperbranched Carbosilane Macromolecules"; Journal of Polymer Science: Part A: Polymer Chemistry; vol. 39; 3287-3293 (2001).
Kim, C. et al.: "Synthesis and Characterization of End-Functionalized Carbosiloxane Dendrimers"; Journal of Polymer Science: Part A: Polymer Chemistry; vol. 40; 326-333 (2002).
Nagashima, H. et al.: "($PPh_3$RhCI-Catalyzed Hydrosilylation of Unsaturated Molecules by 1,2-Bis(dimethylsilyl) ethane: Unprecedented Rate Difference between Two SI-H Bonds"; Organometallics 1989; 8; 2495-2496.
Morikawa, A. et al.: "Synthesis and Characterization of New Polysiloxane Starburst Polymers"; Macromolecules; vol. 24; No. 12; Jun. 10, 1991.
Sargent, J. R. et al: "End Group Analysis Accounts for the Low Molecular Weight Observed in the 1,3-Divinyltetramethyldisiloxane-Pt Complex Catalyzed Hydrosilylation Copolymerization of a,w-Dienes and 1,3-Dihydridotetramethyldisiloxane"; Macromolecules 1999; 32; 2826-2829.
Yoon, K. et al.: "Synthesis of Hyperbranched Poly (carbosilarylenes)"; Macromolecules 1999, 32, 5210-5216.
Ganguly, S. C. et al.: "Synthesis, Characterization and Thermal Stability of Siloxane-Divinyl Benzene Copolymer by Hydrosilation Reaction"; Polymeric Materials: Science & Engineering 2002; 86; 193.

EPOXY-FUNCTIONAL HYBRID COPOLYMERS

FIELD OF THE INVENTION

The invention relates to reactive organic/inorganic hybrid molecules and copolymers.

BACKGROUND OF THE INVENTION

Epoxy functional UV and thermally curable materials are ubiquitous in the fields of adhesives, coatings, films and composites. The benefits of utilizing epoxy-based materials include generally good adhesion, widely variable curing mechanisms and curing rates, fairly cheap and readily available raw materials and good chemical resistance. The widespread use and longevity of epoxy technology is testament to its utility even in the face of more recently developed chemistries such as cyanate esters and maleimide resins, to name a few. In spite of the general acceptance of typical epoxy materials, several deficiencies are recognized within the industries which utilize thermosetting and UV curable materials. Common epoxy resins, chemically described hereafter, typically cure to relatively rigid, high $T_g$ materials. Also, the upper use temperature of epoxy-based materials is generally in the region of 150° C. to 180° C., somewhat lower than that required for many demanding application areas. Lastly, the moisture uptake of most epoxy materials under high humidity conditions is on the order of several weight percent. This level of moisture absorption is undesirable for many applications, particularly in the areas of electronics adhesives and coatings. weight percent. This level of moisture absorption is undesirable for many applications, particularly in the areas of electronics adhesives and coatings.

The most common epoxy resins are aromatic molecules such as bisphenol A diglycidyl ether (DGEBPA) or epoxidized novolak resins (such as the EPON® series of resins sold by Shell Chemical). These resins, derived from the reaction of epichlorohydrin with alcohols (or an equivalent synthetic process), are most commonly utilized for thermally curing applications. For UV curable systems, cycloaliphatic type epoxy systems (such as ERL 4221 or ERL 6128 sold by Union Carbide) are more commonly used due to their rapid cationic curing kinetics. Rubberized epoxies, commonly derived from chain extension of amino- or carboxyl-terminal rubbers with bis(epoxides), are typical film forming epoxy-functional materials. All of these systems suffer from one or more of the aforementioned deficiencies of epoxy-based systems. The rigidity of most commercial cured cycloaliphatic epoxy materials is particularly notable.

One approach to improving the flexibility, thermal stability and moisture resistance of classic epoxy materials is the incorporation of siloxane-based resins into the cured epoxy matrix. Various approaches have been taken toward this end, including chain extension of bis(epoxides) with carbinol-terminal siloxanes and the synthesis of a variety of "epoxysiloxanes" via the hydrosilation of unsaturated epoxides onto SiH-functional siloxane materials. With regard to the latter class of materials, attempts have been made to fully consume as much of the SiH functionality as possible during these syntheses, as it has been correctly noted that the presence of SiH functionality, epoxide functionality and residual transition metal catalyst (especially platinum) leads to variably unstable products. It is well known to those practiced in the art that complete consumption of the silicon-hydride functionality on many silicone backbones is a challenging synthetic goal.

The use of rhodium based catalysts has been shown to reduce the tendency for epoxide functionality to polymerize in the presence of SiH groups during these hydrosilation reactions. Techniques involving the monohydrosilation of certain classes of disilanes and disiloxanes have been utilized to yield SiH-functionalized molecules and intermediates. Several literature citations note the possibility of synthesizing a material with both SiH and epoxy functionality. The limited examples involving the use of these intermediates do not produce products with highly controlled molecular geometries and/or epoxy contents. Epoxy-endcapped linear copolymers of silicon hydride-terminal poly(dimethylsiloxane)s and difunctional polyethers (typically allyl-terminal poly(proylene glycol) have also been described. The resulting linear copolymers exhibit improved compatibility with organic materials. Such linear copolymers are limited by their necessarily bis-functionality (at most two epoxy groups per linear polymer), and have not been extended to incorporate silane inorganic repeat units or organic dienes beyond those derived from poly(ethers). This significantly reduces the utility of these polymeric materials in applications which demand reasonably high levels of crosslink density. The molecular architecture of these linear copolymers is not well defined, in that such materials exhibit the statistical distribution of molecular weights typical of "one step" polymerizations. The general effects of molecular weight distribution on material and viscoelastic properties are well known.

The synthesis and use of either SiH-terminal or olefin-terminal diene-siloxane copolymers (precursors to the epoxy-functional materials discussed above) has also been documented, but synthetic strategies have not been developed to allow for extension to radial structures as discussed herein.

In general, resins known in the prior art containing both epoxide and siloxane functionality exhibit poor compatibility with common, industrially useful, epoxide resins such as epoxy novolaks, DGEBPA and representative cycloaliphatic epoxides such as ERL-4221 and ERL 6128 described above. This poor "organic compatibility" of "epoxysiloxanes" known in the prior art is well known. Most often, macroscopic phase separation quickly occurs when blends with hydrocarbon resins are attempted. Although the functionalization of siloxane materials with alkyleneoxy sidechains is known to enhance compatibility in some organic materials, for many applications (such as electronics adhesives and coatings) the increased hydrophilicity of the resulting siloxane materials is problematic.

It is therefore one intention of the current invention to provide industrially feasible syntheses of hydrophobic epoxysiloxanes with good compatibility in common hydrocarbon-based epoxy resins. It is further our intention to present the synthesis of novel linear and "radial" geometry epoxy-functional siloxane or silane/hydrocarbon copolymers with 1) highly controllable molecular geometry (polydispersities of approximately one), 2) tailorable silicon: hydrocarbon ratios, and 3) variable levels of epoxy functionality (typically greater than two). Finally, the inventive materials of this application exhibit several desirable features not found in the materials of prior art such as: 1) improved hydrocarbon compatibility relative to most commercial epoxysiloxane resins, 2) improved hydrophobicity relative to hydrocarbon-based epoxies, 3) improved thermal stability relative to hydrocarbon-based epoxies, 4) high UV reactivity relative to many commercial epoxies, and 5) improved material properties relative to typical cycloaliphatic epoxies used for UV cure applications.

Additionally, it is recognized that the intermediate olefin terminal and SiH terminal radial copolymers of the current invention are also novel and useful. For example, alkenyl-terminal resins may be used as reactive intermediates alone or in combination with other materials. Similarly, SiH-terminal materials may be used as reactive crosslinkers for hydrosilation cure compositions.

SUMMARY OF THE INVENTION

Figure 1:
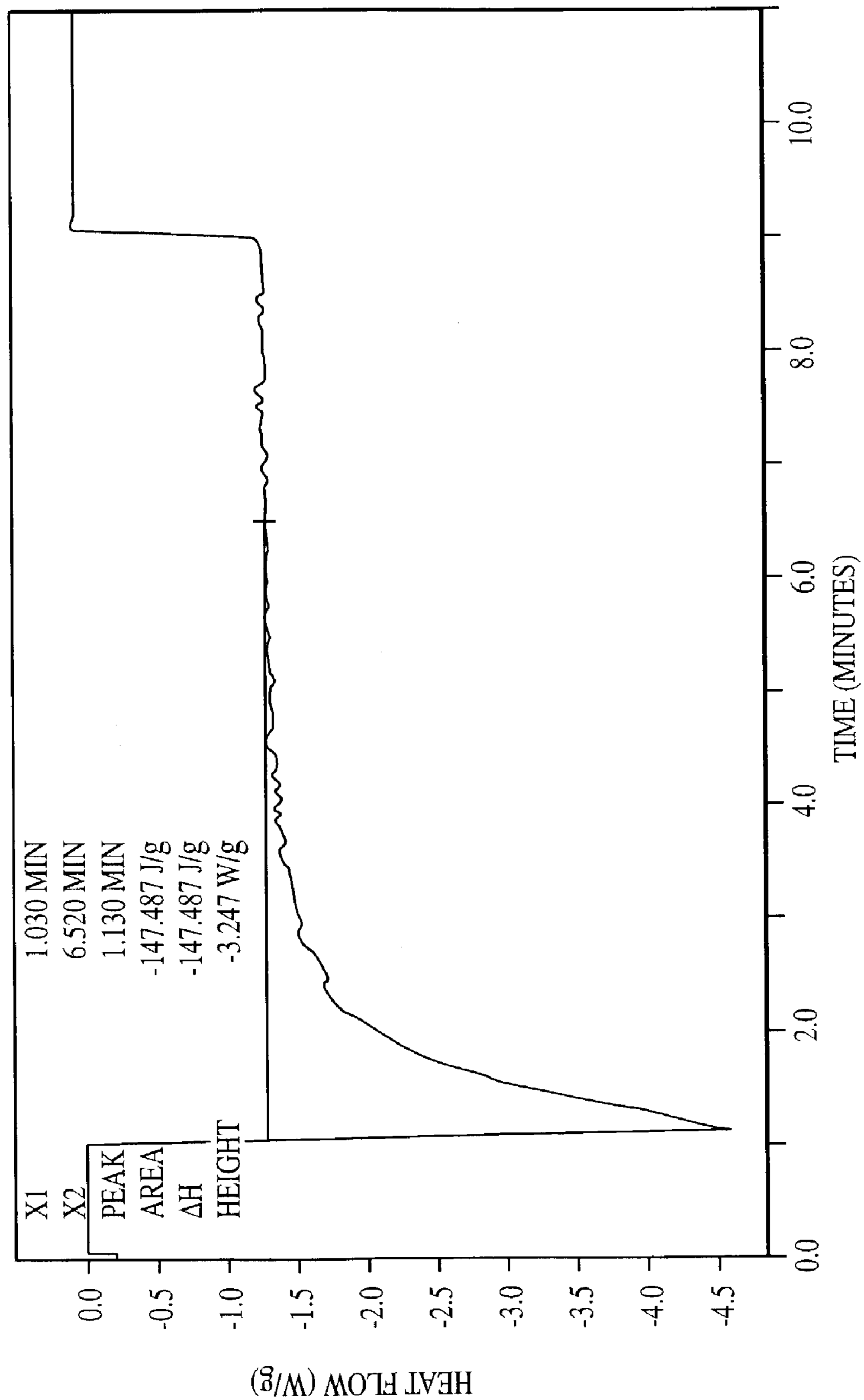
FIG. 1 is a photo DSC of UV cured radial hybrid epoxy 2.

Versatile synthetic methodology has been established for the production of a variety of siloxane and silane-containing radial epoxy resins. This chemical approach has been exploited to obtain a variety of hybrid organic/inorganic materials that can generally be described as epoxysiloxane or epoxysilane radial copolymers. The methodology can be used to access reactive, hydrophobic Si-containing resins with good organic compatibility that are structurally distinct from epoxy-functional siloxanes/silanes known in the prior art.

These hybrid radial epoxy resins may be utilized for a variety of adhesive and coating applications including radiation and thermally curable sealants, encapsulants and adhesives.

DETAILED DESCRIPTION OF THE INVENTION

The most common technique utilized to produce epoxy-functional siloxane materials has been through the hydrosilation of unsaturated epoxides with various polymeric and small-molecule hydrosiloxanes (e.g. poly(methylhydrosiloxane) and 1,1,3,3-tetramethyldisiloxane respectively). This type of process is also commonly used to attach organic-compatibilizing groups onto silicone resins as well (e.g. hexyl, octyl or ethylenoxy groups). Although this synthetic approach has produced many commercially and academically interesting materials, the basic molecular architecture of organic groups extending away from the siloxane "backbone" often produces materials with limited solubility in organic materials unless extremely high levels of carbon based components are attached to the siloxane. Not only does the incorporation of large relative amounts of organic functionality dilute many of the inorganic properties of siloxanes (for example, many alkylenoxy-modified siloxanes are quite hydrophilic), but extensive/complete functionalization of hydrosiloxanes is often synthetically challenging. Many of these statements hold true for the hydrosilation of silane base resins with unsaturated organics as well.

The present invention provides an approach that allows for extensive tuning of the organic/inorganic ratio during the development of new epoxysiloxanes and epoxysilanes. Additionally, the synthetic procedures yield products with little or no polydispersity due to the iterative addition of alternating siloxane/silane and hydrocarbon blocks. The versatility of the synthetic scheme has allowed for the synthesis of a variety of structurally unique organic/inorganic hybrid materials with desirable uncured and cured properties. The resulting materials are light curable, electron-beam curable or thermally curable. Further, the materials have a variety of uses, including as adhesives, sealants, coatings and coatings or encapsulants for organic light emitting diodes. In particular, optimal carbon content hybrid materials are targeted in order to obtain improved compatibility with common commercial UV curable and thermosetting reactive materials. Thus, in blends of the inventive materials with commercial carbon-based resins, many of the desirable properties of siloxanes are achieved (flexibility, hydrophobicity, thermal stability) while maintaining the favorable characteristics of the base organic material (such as strength, substrate wetting, and adhesion). The inventive epoxysiloxanes and epoxysilanes can be used widely, in many of the same ways as traditional carbon-based epoxies, to impart siloxane-type properties to various materials.

The basic synthetic methodology involves the controlled addition of alternating siloxane (or silane) and hydrocarbon blocks to a central hydrocarbon "core" which typically has a functionality greater than two. The resulting radial copolymeric structures may optionally be SiH terminal or olefin terminal and can be generally represented by the following structures:

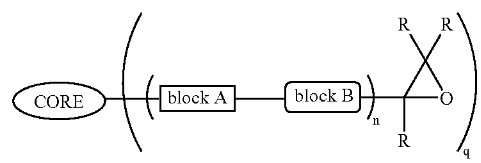

Epoxy Terminal Organic/Inorganic Block Copolymers with Organic Cores

Wherein n=1–100, CORE is defined to be a hydrocarbon unit, block B is an organic unit, block A is a siloxane and/or silane unit. In a preferred embodiment, n=1–5 and q=3–20. In a more further preferred embodiment, q=3–6. In the case that block B contains polyether units, q must be 3 or greater.

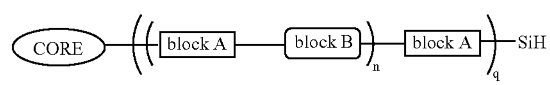

Organic/Inorganic Block Copolymers with Organic Cores and SiH Termini wherein n=0–100, q=3–20, CORE is defined to be a hydrocarbon unit, block B is an organic unit and block A is a siloxane and/or silane unit. In a preferred embodiment, n=0 and q=3–6.

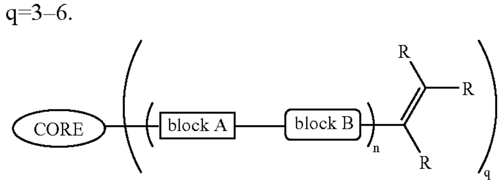

Organic/Inorganic Copolymers with Olefin Termini

In this embodiment n=1–100 and q=3–20. In the preferred embodiment, n=1–5 and q=3–6.

In all three of the above embodiments R is independently H, a linear or branched alkyl, cycloalkyl, aromatic, substituted aromatic, or part of a cyclic ring and may contain heteroatoms such as, but not limited to, O, S, N, P or B.

The subsequent examples will best illustrate the most commonly investigated versions of this structure, but those skilled in the art will recognize other obvious possibilities which fall within the scope of the present invention. Often, the CORE is a hydrocarbon moiety with multiple unsaturated substituent groups. For example, suitable organic COREs are derived from tetraallylbisphenol A; 2,5-diallylphenol, allyl ether; trimethylolpropane triallyl ether; pentaerythritol tetraallyl ether; triallylisocyanurate; triallylcyanurate; or mixtures thereof. In the event that q<3, diallybisphenol A; 1,4-divinyl benzene; 1,3-divinyl benzene or mixtures thereof may also be utilized. Block B is often derived from alkyl (such as ethyl), cycloalkyl (such as dicyclopentadienyl) or aromatic (such as dialkylstyryl). Block B may comprise one or more of linear or branched alkyl units, linear or branched alkyl units containing heteroatoms, cycloalkyl units, cycloalkyl units containing heteroatoms, aromatic units, substituted aromatic units, heteroaromatic units, or mixtures thereof, wherein heteroatoms include, but are not limited to, oxygen, sulfur, nitrogen, phosphorus and boron. Block B is preferably derived from1, 3-bis(alphamethyl)styrene; dicyclopentadiene; 1,4-divinyl benzene; 1,3-divinyl benzene; 5-vinyl-2-norbornene; 2,5-norbornadiene; vinylcyclohexene; 1,5-hexadiene; 1,3-butadiene, or some combination of these. In the event that olefin terminal structures are isolated, the unsaturated endgroups are typically directly derived from the unreacted end of the bis(olefin) utilized as Block B. Block A is often derived from 1,1,3,3-tetramethyldisiloxane; 1,1,3,3,5,5-hexamethyltrisiloxane; 1,1,3,3,5,5,7,7-octamethyltetrasiloxane; bis(dimethylsilyl)ethane (1,1,4,4-tetramethyldisilethylene); 1,4-bis(dimethylsilyl)benzene; 1,3-bis(dimethylsilyl)benzene; 1,2-bis(dimethylsilyl)benzene or mixtures thereof. The epoxy endgroups are often cycloaliphatic or glycidyl in nature, but are not limited to such.

Generally speaking, the synthetic methodology described herein can be applied to most any unsaturated core molecule in conjunction with difunctional olefins (the organic blocks) and compounds containing two SiH groups (e.g. SiH-terminal siloxane oligomers or SiH terminal silanes; the "inorganic blocks"). A frequent practical stipulation is that excess bis(olefin) and bis(silicon hydride) compounds can be removed from the product. Most often removal is affected via vacuum evaporation. Typically, the excess reagent can easily be collected and recycled as it is being removed by vacuum distillation in order to make the process economical. Conversely, if the chemical nature of either of the difunctional repeat units (diene or bis(SiH) compound) are such that they can be reacted at only one end under certain reaction conditions, then stoichiometric amounts of such reagents can be utilized. In such cases, the need to be able to remove excess reagent is eliminated from the synthetic process. Thus, although in some cases the reaction of one end of the difunctional reagent deactivates the other end of the molecule toward further reaction to some extent (under appropriately controlled reaction conditions), this effect is not necessary for the processes described herein. Common examples of this effect can be found in the hydrosilation reaction of TMDS or TMDE with various unsaturated materials. Under appropriate reaction conditions one of the SiH bonds will participate in hydrosilation but, as is known, the second SiH group will not until higher temperatures or more active catalysts are used. In yet other instances, difunctional reagents with reactive groups of significantly different reactivities can be used to obtain selectivity and avoid the need to use a large excess of the repeat unit molecule. An excellent example of this can be found in the hydrosilation of dicyclopentadiene (DCPD), which undergoes hydrosilation at its norbornenyl double bond orders of magnitude faster than at its cyclopentadienyl double bond. Although such regioselective and chemoselective reactions are known, the use of excess bis(silicon hydride) and bis(olefin) in combination with recycling is often the most efficient industrial chain/arm extension process and, in many cases, yields the purest products. It is important to note that if, during the chain extension process with either difunctional reagent, the reagent reacts at both of its ends this will quickly result in unwanted molecular weight increases, polydispersity and gellation when dealing with the multifunctional, radial molecular geometries of the present invention.

After one has linearly or radially extended the organic/inorganic "arms" of the copolymers away from the core to the desired "generation" to yield a SiH-terminal radial copolymer, this molecule is endcapped with an unsaturated epoxy molecule. The nature of this unsaturated epoxy molecule can vary widely depending on the intended end use of the radial copolymer. For example, one might endcap with vinyl cyclohexene oxide in order to produce a hybrid cycloaliphatic epoxy resin for use in cationically initiated UV curing applications. For thermally curable materials allylglycidyl ether is a logical endgroup precursor.

It is within the scope of the current invention to extend the organic/inorganic blocks outward from a siloxane or other inorganic core as well. This is an effective way to increase the inorganic:organic ratio of the materials, which may be useful for some applications. Thus, compounds such as those shown in the following structure or envisioned:

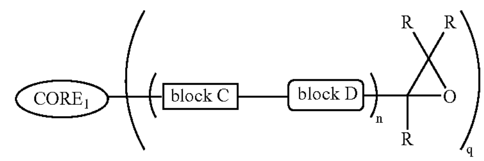

Organic/Inorganic Block Copolymers with Inorganic Cores

In this case, $CORE_1$ is an inorganic composition, often a SiH-terminal siloxane. A preferable cyclic example of a $CORE_1$ is 1,3,5,7-tetramethylcyclotetrasiloxane ($D'_4$). Other potential $CORE_1$ compositions are tetrakis(dimethylsiloxy) silane; octakis(dimethylsiloxy)octaprismosilsequioxane; and mixtures thereof. Block C is then an organic diene and block D is an inorganic bis(SiH-functional) material. The structural descriptions of these blocks and the epoxy-termini are the same as those described above for organic CORE materials, with Block C corresponding to Block B, and Block D corresponding to Block A. Similarly, n=1–100 and q can range from 1–20, however for the olefin terminal materials n may range from 0–100. In the event that Block C contains ether units, q must be 3 or greater.

Similarly, structures with an inorganic $CORE_1$ may have olefin or SiH terminal functionality as illustrated in the following two structures:

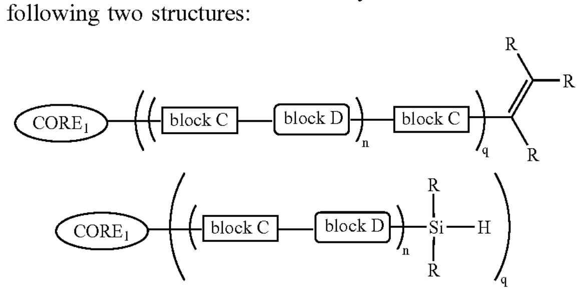

Inorganic/Organic Block Copolymers with Inorganic Cores and SiH or Olefin Termini The examples demonstrate the utility of the hybrid materials for use in radiation and thermal curing compositions. The term "radiation" is generally defined herein as electromagnetic radiation having energies ranging from the microwave to gamma regions of the electromagnetic spectrum. As noted, thermal and electron beam energy sources may also be used to cure the inventive compositions. The scope of the possible methods to initiate/cure the systems described hereafter is essentially defined by the nature of the energy utilized and initiators well known to individuals skilled in the art.

It is further recognized that one skilled in the art can use the reactive organic/inorganic hybrid copolymers of the present invention in combination with various additives such as fillers, rheology modifiers, dyes, adhesion promoters, and the like in order to control the properties of the cured and uncured compositions. Inorganic fillers that may be utilized include, but are not limited to, talc, clay, amorphous or crystalline silica, fumed silica, mica, calcium carbonate, aluminum nitride, boron nitride, silver, copper, silver-coated copper, solder and the like. Polymeric fillers, such as poly (tetrafluoroethylene), poly(chlorotrifluoroethylene), graphite or poly(amide) fibers may also be utilized. Potentially useful rheology modifiers include fumed silica or fluorinated polymers. Adhesion promoters include silanes, such as γ-mercaptopropyltrimethoxysilane, γ-glycidoxypropyltrimethoxysilane, γ-aminopropyltrimethoxysilane, γ-methacryloxypropyltriethoxysilane, β-(3,4-epoxycyclohexyl) ethyltrimethoxysilane and the like. Dyes and other additives may also be included as desired.

Specific practical aspects of this synthetic procedure are best exemplified by the following non-limiting examples.

EXAMPLE 1

Synthesis of Tetraallylbisphenol A/TMDS Adduct 1 dichloro-bis(cyclooctadiene)Pt (50 ppm Pt, 0.95 mL of a 2 mg/mL 2-butanone solution of the catalyst complex; DeGussa) was added to the reactor. The internal reaction temperature was then raised to ~70° C.

The TABPA was added dropwise to the reactor over a period of ~25 minutes, maintaining an internal temperature less than 75° C. A steady reaction exotherm was observed during the addition. The reaction was stirred at ~70° C. for 10 minutes after the addition was complete. FT-IR analysis indicated essentially complete consumption of the allyl double bonds as judged by the disappearance of the C═C stretching bands centered at 1645 $cm^{-1}$ and 1606 $cm^{-1}$.

The reaction was allowed to cool to below 40° C., at which point excess TMDS was removed in vacuo. This TMDS is pure (as determined by GC, $^{1}H$ NMR and $^{29}Si$ analysis), and can be recycled. A pale yellow oil was obtained as a product in essentially quantitative yield. The material was analyzed by $^{1}H$, $^{29}Si$, and $^{13}C$ NMR, GC, MS, GPC and FT-IR. The product exhibited spectral characteristics consistent with the structure of tetrasilane 1. GPC analysis produced a single peak with a low polydispersity of 1.2 (it is notable that the polydispersity index of the tetrallyl bisphenol starting material is 1.1). EI-MS analysis produced the expected main molecular ion at 924 (calculated molecular ion of tetrasilane 1=924) and a smaller, higher MW molecular ion at 999 (which is attributed to a small amount of hexamethyltrisiloxane present in the tetramethyldisiloxane starting material). The resin titrated to 3.84 meq SiH/g resin, 98% of the theoretical value (theoretical SiH value=3.9 meq SiH/g resin; calculated from the titrated olefin content of the TABPA starting material of 8.4 meq olefin/g resin).

1

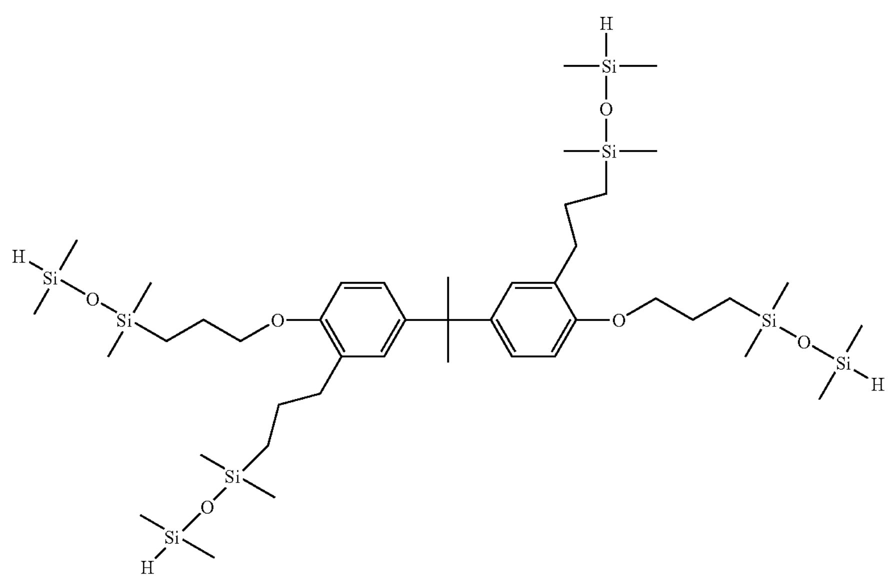

A 500 mL four-necked round bottom flask was equipped with a reflux condenser, addition funnel, internal temperature probe and magnetic stirrer and placed under light nitrogen flow. The flask was charged with 1,1,3,3-tetramethyldisiloxane (364 mL, 2.06 mol; "TMDS"; Hanse Chemie). The addition funnel was charged with a mixture of TMDS (5 mL) and tetraallylbisphenol A (20.0 g, 51.5 mmol; "TABPA"; Bimax). Approximately 2 mL of this solution was added to the stirred TMDS of the main reaction vessel. The pot temperature was raised to ~50° C., at which point

EXAMPLE 2

Synthesis of Tetrafunctional Cycloaliphatic Epoxy Generation 1 Radial Siloxane/Hydrocarbon Hybrid Copolymer, 2

Siloxane 1 (Example 1, 8.65 g, 9.35 mmol) was solvated in toluene (26 mL) in a 250 mL three-necked flask equipped with magnetic stirring, an internal temperature probe, reflux condensor and addition funnel. The reactor was placed under a gentle dry nitrogen purge. Vinylcyclohexene oxide ("VCHO", 4.9 mL, 37.4 mmol) was charged to the addition funnel. Approximately 0.25 mL of this epoxy was dripped into the reaction pot, and the contents of the pot was raised to 50° C.

Chlorotris(triphenylphosphine)rhodium ("Wilkinson's catalyst", 4 mg, 50 ppm based on siloxane mass) was added

2

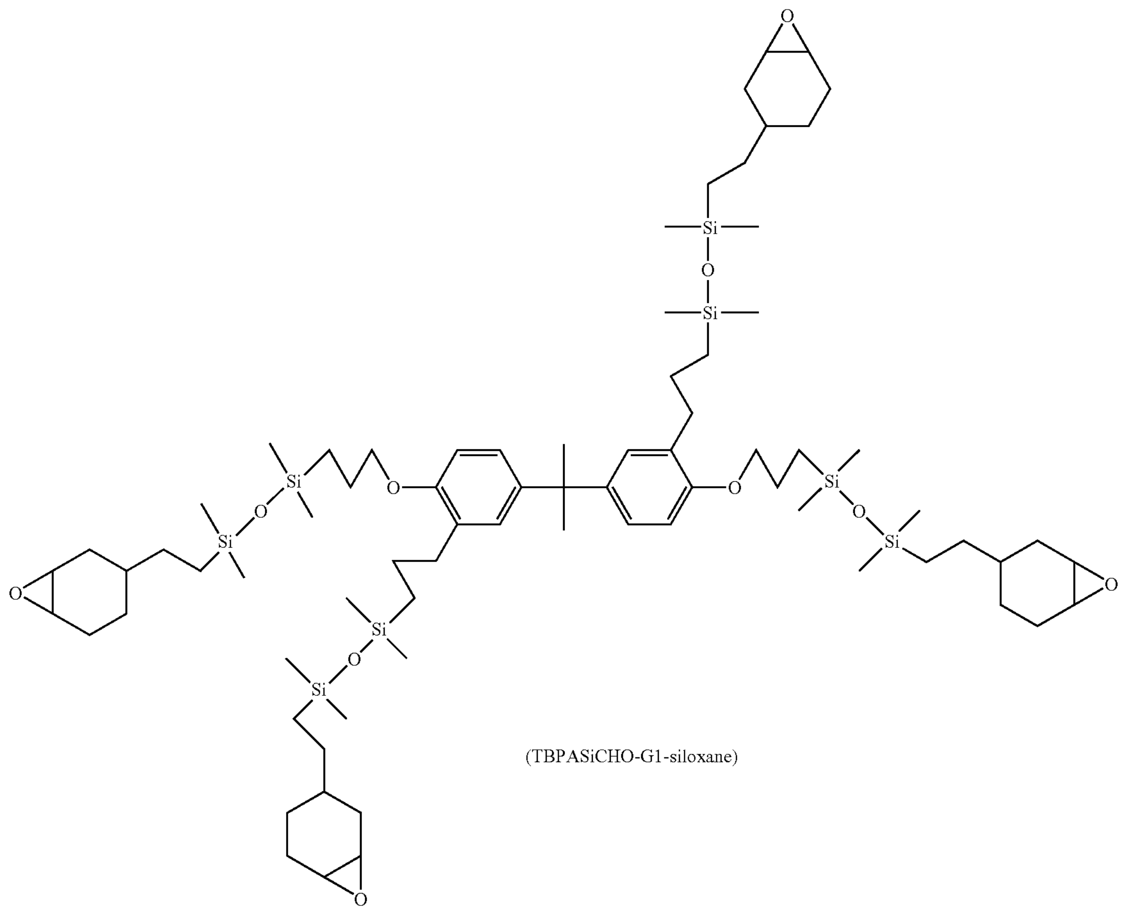

(TBPASiCHO-G1-siloxane)

to the pot. The internal temperature of the reaction was then raised to 65° C., and the dropwise addition of VCHO was commenced. An exotherm was observed during the addition, which was complete after 20 minutes. The internal temperature of the reaction was maintained below 68° C. during the addition process. This temperature was easily controlled via the VCHO addition rate and the application/removal of heat to the reaction vessel.

The reaction was stirred at 65° C. for 5 minutes after the addition was complete. FT-IR analysis indicated the reaction was complete, as judged by the absence of a SiH band (2119 $cm^{-1}$) in the IR spectrum. The reaction was allowed to cool to room temperature, at which point activated carbon (~0.25 g) was slurried with the solution for 30 minutes. The solution was filtered, and solvent was removed from the filtrate in vacuo to yield a yellow oil. The material was analyzed by $^{1}H$, $^{29}Si$, and $^{13}C$ NMR and FT-IR. The spectral characteristics of the product were consistent with those expected of the radial hybrid epoxy compound 2. GPC analysis produced a single peak with very low polydispersity (1.2).

EI-MS analysis produced the expected main molecular ion at 1422 (calculated molecular ion of hybrid radial epoxy 2=1422) and a smaller, higher MW ion at 1498 (which is again attributed to a small amount of hexamethyltrisiloxane present in the tetramethyldisiloxane starting material). Average epoxy equivalent weight (EEW) was found to be ~402 (107% of the theoretical value calculated from a SiH value for compound 1 of 3.9 meq SiH/g resin).

EXAMPLE 2a

Synthesis of Tetrafunctional Cycloaliphatic Epoxy Generation 1 Radial Siloxane/Hydrocarbon Hybrid Copolymer, 2 (Alternate Synthesis)

A 500 mL four-necked round bottom flask was equipped with a reflux condenser, addition funnel, internal temperature probe and magnetic stirrer and placed under light nitrogen flow. The flask was charged with siloxane 1 (Example 1, 40.0 g, 43 mmol) solvated in toluene (20 mL). The pot temperature was raised to ~65° C. Vinylcyclohexene oxide ("VCHO", 21.7 g, 175 mmol) was charged to the addition funnel. Approximately 3.0 mL of this epoxy was dripped into the reaction pot.

A solution of platinum-tetravinylcyclosiloxane complex (Pt-$D^{v}_{4}$ "Karstedt's catalyst", 3.5 wt. % active $Pt^0$, 40 ppm $Pt^0$ based on the mass of siloxane 1, 0.046 g of Pt complex, Gelest) was added to the vessel.

The VCHO was added dropwise to the reactor over a period of ~1 hour, maintaining an internal temperature less than 75° C. A steady reaction exotherm was observed during the addition. This temperature was easily controlled via the VCHO addition rate and the application/removal of heat to the reaction vessel.

The reaction was stirred at 70° C. for 1 hour after the addition was complete. FT-IR analysis indicated the reaction was complete, as judged by the absence of a SiH band (2119 $cm^{-1}$) in the IR spectrum. The reaction was allowed to cool to room temperature, at which point activated carbon (~2.0 g) was slurried with the solution for 1 hour. The solution was filtered, and solvent was removed from the filtrate in vacuo to yield a yellow oil. The material was analyzed by $^{1}H$, $^{29}Si$, and $^{13}C$ NMR and FT-IR. The spectral characteristics of the product were consistent with those expected of the hybrid epoxy compound 2. The epoxy equivalent weight (EEW) of the product was 390 g resin/mol epoxy.

EXAMPLE 3

Synthesis of Tetrtaallylbisphenol A/Bis(dimethylsilyl) Ethylene Adduct

A 250 mL four-necked round bottom flask was equipped with a reflux condensor, addition funnel, internal temperature probe and magnetic stirrer and placed under light nitrogen flow. The flask was charged with Bis (dimethylsilyl) ethane (34.6 g, 514 mmol; "TMDE"; Gelest) and warmed to an internal temperature of 65° C. The addition funnel was charged with tetraallylbisphenol A (20.0 g, 51.5 mmol; "TABPA"; Bimax). Approximately 1 mL of this solution was added to the stirred TMDE of the main reaction vessel.

Chlorotris(triphenylphosphine) rhodium ("Wilkinson's catalyst", 4 mg, ~40 ppm based on siloxane mass) was added to the pot.

The dropwise addition of TABPA was commenced. A steady exotherm was observed during the addition, which was complete after 1 hour. The internal temperature of the reaction was maintained below 80° C. during the addition process. This temperature was easily controlled via the TABPA addition rate and the application/removal of heat to the reaction vessel. The reaction was held at ~80° C. for 30 minutes after the addition was complete. FT-IR analysis indicated essentially complete consumption of the allyl double bonds as judged by the disappearance of the C═C stretching bands centered at 1645 $cm^{-1}$ and 1606 $cm^{-1}$.

The reaction was allowed to cool to below 40° C., at which point excess TMDE was removed in vacuo. This TMDE is pure (as determined by $^{1}H$ NMR and $^{29}Si$ analysis), and can be recycled. A yellow oil was obtained in essentially quantitative yield. The material was analyzed by $^{1}H$, $^{29}Si$, and $^{13}C$ NMR and FT-IR. The product exhibited spectral characteristics consistent with the structure of tetrasilane 3. The material exhibited a SiH content of 4.31 meq SiH/g resin, 105% of the theoretical value.

3

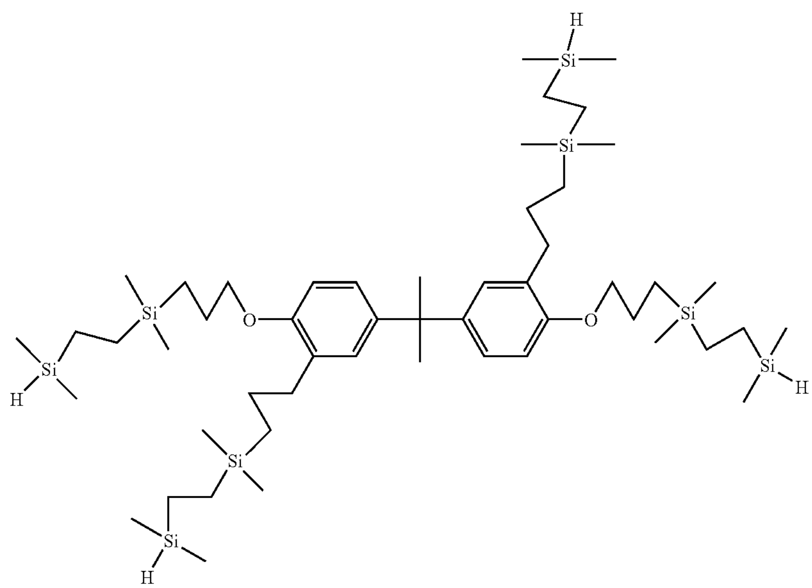

EXAMPLE 4

Synthesis of Tetrafunctional Cycloaliphatic Epoxy Generation 1 Radial Silane/Hydrocarbon Copolymer, 4

A 500 mL four-necked round bottom flask was equipped with a reflux condenser, addition funnel, internal temperature probe and magnetic stirrer and placed under light nitrogen flow. The flask was charged with siloxane 3 (16.25 g, 16.7 mmol) solvated in toluene (20 mL). The pot temperature was raised to ~65° C. Vinylcyclohexene oxide ("VCHO", 8.39 g , 67.6 mmol) was charged to the addition funnel. Approximately 1 mL of this epoxy was dripped into the reaction pot.

A solution of $Pt^{0}$-tetravinylcyclotetrasiloxane complex (3.5% active $Pt^{0}$, 50 ppm $Pt^{0}$ based on the mass of siloxane 3, 0.232 g of $Pt^{0}$ complex, Gelest) was added to the vessel.

The VCHO was added dropwise to the reactor over a period of ~1 hour, maintaining an internal temperature less than 70° C. A steady reaction exotherm was observed during the addition. This temperature was easily controlled via the VCHO addition rate and the application/removal of heat to the reaction vessel.

The reaction was stirred at 75° C. for 1 hour after the addition was complete. FT-IR analysis indicated the reaction was almost complete, as judged by the near absence of a SiH band (2119 cm$^{-1}$) in the IR spectrum. To the reaction was added an additional 0.5 g VCHO and additional Pt$^0$-catalyst (0.007 g catalyst solution). The reaction was stirred at 75° C. for additional 30 minutes and was judged complete by absence of a SiH IR band. The reaction was allowed to cool to room temperature, at which point activated carbon (~3.0 g) was slurried with the solution for 1 hour. The solution was filtered, and solvent was removed from the filtrate in vacuo to yield a yellow oil. The material was analyzed by $^1$H, $^{29}$Si, and $^{13}$C NMR and FT-IR. The spectral characteristics of the product were consistent with those expected of the hybrid epoxy compound 4. The molecule exhibited an EEW of 430 g resin/mol epoxy.

4

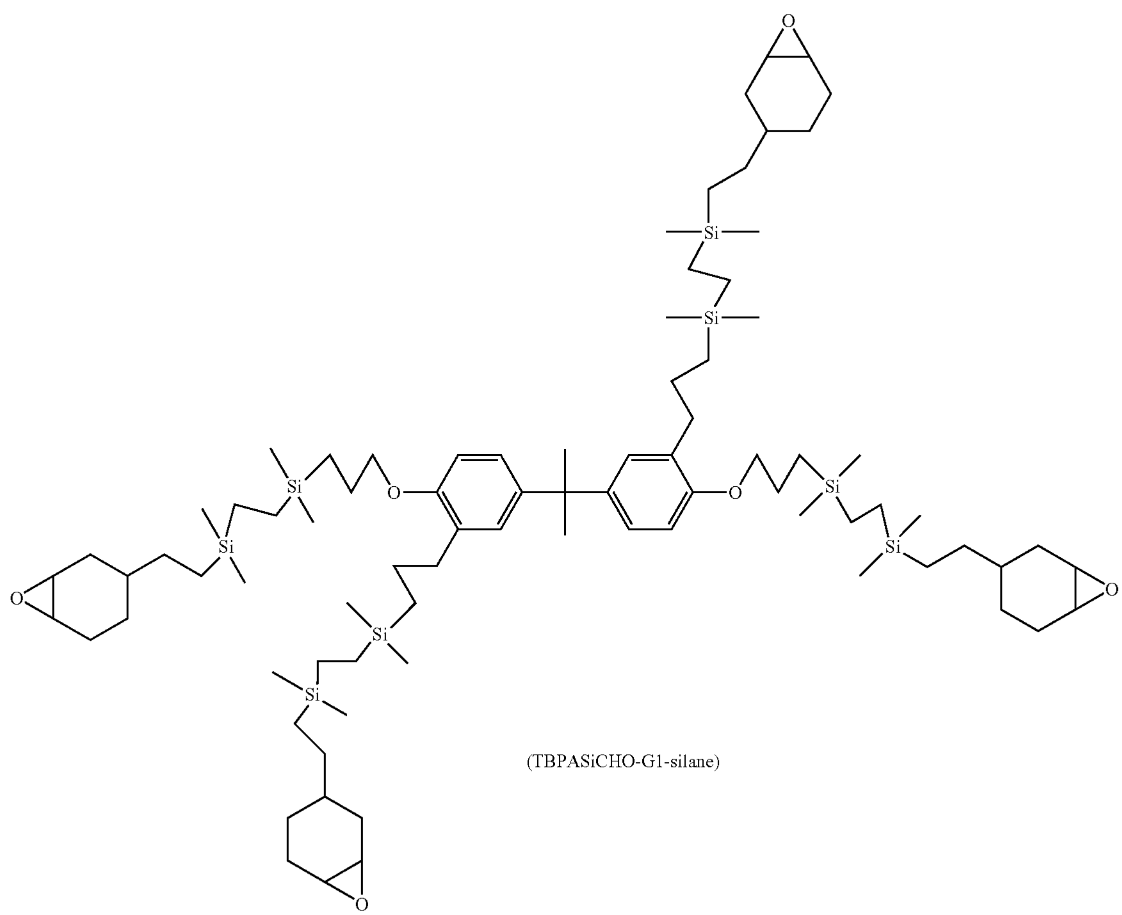

(TBPASiCHO-G1-silane)

EXAMPLE 5

Synthesis of Tetrafunctional Glycidyl Epoxy Generation 1 Radial Siloxane/Hydrocarbon Copolymer Siloxane 1 (Example 1, 3.00 g, 3.24 mmol) was solvated in toluene (5 mL) in a 100 ml three-necked flask equipped with magnetic stirring, an internal temperature probe, reflux condenser and addition funnel. The reactor was placed under a gentle dry nitrogen purge. Allyl glycidyl ether ("AGE", 1.48 g, 13.0 mmol) was dissolved on toluene (5 mL) and charged to the addition funnel. Approximately 0.25 ml of this epoxy was dripped into the reaction pot, and the contents of the pot was raised to 60° C.

A solution of platinum-$D^v_4$ complex (3.5% active Pt$^0$, 50 ppm Pt$^0$ based on the mass of siloxane 1, 0.042 g of Pt complex, Gelest) was added to the vessel.

The AGE was added dropwise to the reactor over a period of ~10 minutes, maintaining an internal temperature less than 80° C. A slight reaction exotherm was observed during the beginning of the addition. The reaction was stirred at 80° C. for 5 hours after the addition was complete. FT-IR analysis indicated the reaction was complete, as judged by the absence of a SiH band (2119 cm$^{-1}$) in the IR spectrum. The reaction was allowed to cool to room temperature, at which point activated carbon (~0.5 g) was slurried with the solution for 1 hour. The solution was filtered, and solvent was removed from the filtrate in vacuo to yield yellow oil (4.48 g, 85%). The spectral characteristics of the product were consistent with those expected of the hybrid epoxy compound 5. The EEW of the product was found to be 422 g resin/mol epoxy.

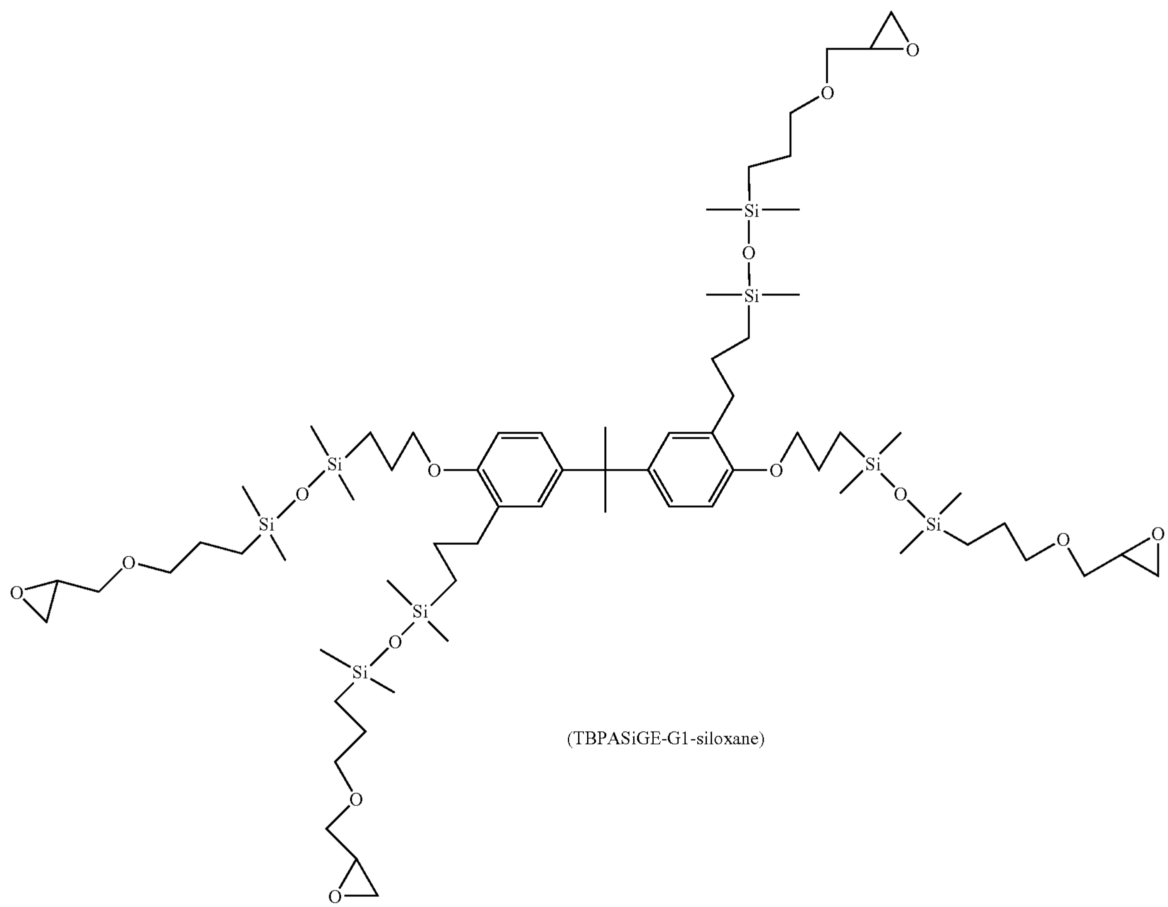

(TBPASiGE-G1-siloxane)

EXAMPLE 6

Synthesis of Diallyl Ether Bisphenol A/TMDS Adduct 6

A 500 mL four-necked round bottom flask was equipped with a reflux condenser, addition funnel, internal temperature probe and magnetic stirrer. The flask was charged with 1,1,3,3-tetramethyldisiloxane (573 mL, 3.25 mol; "TMDS"; Hanse Chemie). The pot temperature was raised to ~65° C. The addition funnel was charged with diallyl ether bisphenol A (50 g, 0.162 mol; "DABPA"; Bimax). Approximately 5 mL of the DABPA was added to the stirred TMDS of the main reaction vessel. This was followed with the addition of dichlorobis(cyclooctadiene)$Pt^{II}$ (40 ppm Pt, 1.9 mL of a 2 mg/mL 2-butanone solution of the catalyst complex; DeGussa) to the reactor.

The TABPA was added dropwise to the reactor over a period of ~25 minutes with a slight exotherm occurring at the beginning of the slow addition. The reaction was stirred at ~70° C. for 10 minutes after the addition was complete. FT-IR analysis indicated incomplete consumption of the allyl double bonds as judged by the disappearance of the C═C stretching bands centered at 1648 $cm^{-1}$. Additional dichlorobis(cyclooctadiene)$Pt^{II}$ (20 ppm Pt, 1.0 mL catalyst solution) was added. A slight exotherm occurred after the addition of the booster catalyst. The reaction was held at 70° C. for 1 hour. FT-IR analysis indicated incomplete reaction and additional dichloro-bis(cyclooctadiene)$Pt^{II}$ (30 ppm Pt, 1.4 mL of catalyst solution) was added to the solution. After 10 minutes, FT-IR indicated the reaction was complete.

The reaction was allowed to cool to below 40° C., at which point excess TMDS was removed in vacuo. This TMDS is pure (as determined by $^{1}$H NMR and $^{29}$Si analysis), and can be recycled. A yellow product oil was obtained in essentially quantitative yield. The material was analyzed by $^{1}$H, $^{29}$Si, and $^{13}$C NMR and FT-IR. The product exhibited spectral characteristics consistent with the structure of "hybrid siloxane" 6. GPC analysis produced a single peak with a low polydispersity of 1.2. EI-MS analysis produced the expected primary molecular ion at 576.7 (calculated molecular ion of bis(silane) 6=576.5) and a smaller, higher MW molecular ion at 650 (which is attributed to a small amount of hexamethyltrisiloxane present in the tetramethyidisiloxane starting material).

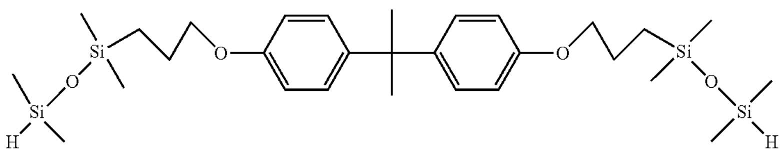

6

Hybrid Siloxane

EXAMPLE 7

Synthesis of Difunctional Cycloaliphatic Epoxy Generation 1 Linear Siloxane/Hydrocarbon Copolymer 7

Hybrid siloxane 6 (28.7 g, 50 mmol) was solvated in toluene (10 mL) in a 250 mL three-necked flask equipped with magnetic stirring, an internal temperature probe, reflux condenser and addition funnel. Vinylcyclohexene oxide ("VCHO", 13.34 mL, 103 mmol) was charged to the addition funnel. The contents of the pot was raised to 75° C. and approximately 0.50 mL of the epoxy was dripped into the reaction pot. This was immediately followed by the addition of dichloro-bis(cyclooctadiene)Pt (ca. 20 ppm Pt based on the mass of hybrid siloxane 6, 0.5 mL of a 2 mg/mL 2-butanone solution of the catalyst complex) to the reactor. The dropwise addition of VCHO was commenced. An exotherm was observed during the addition, which was complete after 20 minutes. The internal temperature of the reaction was maintained below 80° C. during the addition process. This temperature was easily controlled via the VCHO addition rate and the application/removal of heat to the reaction vessel.

The reaction was stirred at 80° C. for 5 minutes after the addition was complete. FT-IR analysis indicated the reaction was complete, as judged by the absence of a SiH band (2119 $cm^{-1}$) in the IR spectrum. The reaction was allowed to cool to room temperature, at which point activated carbon (~1.0 g) was slurried with the solution for 2 hours. The solution was filtered, and solvent was removed from the filtrate in vacuo to yield a yellow oil. The material was analyzed by $^{1}H$, $^{29}Si$, and $^{13}C$ NMR, GPC, EI-MS and FT-IR. The spectral characteristics of the product were consistent with those expected of the hybrid epoxy compound 7. GPC analysis produced a single peak with a polydispersity of 1.7. MS analysis produced the expected main molecular ion at 825 (calculated molecular ion of hybrid epoxy 7=825). Average epoxy equivalent weight (EEW) was typically ca. 498 g resin/mol epoxy.

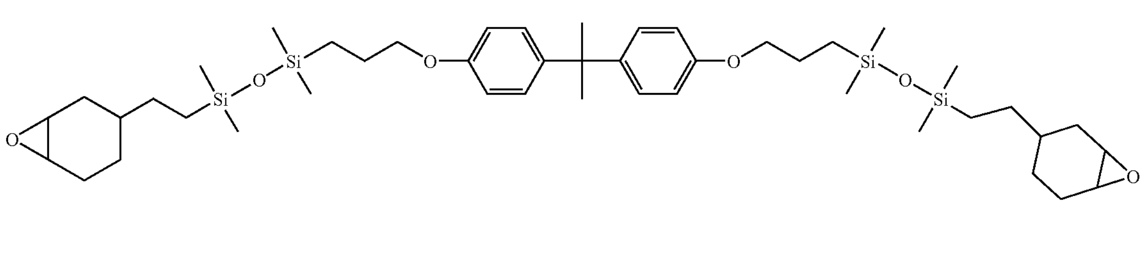

Linear Organic/Inorganic Hybrid Cycloaliphatic Epoxy 7

EXAMPLE 8

Synthesis of Difunctional Glycidyl Epoxy Generation 1 Siloxane/Hydrocarbon Hybrid Copolymer 8

Siloxane 6 (31.0 g, 53 mmol) was solvated in toluene (10 mL) in a 250 mL three-necked flask equipped with magnetic stirring, an internal temperature probe, reflux condensor and addition funnel. Allyl glycidyl ether ("AGE", 15.77 mL, 134 mmol) was charged to the addition funnel. The contents of the pot was raised to 75° C., and approximately 0.50 mL of this epoxy was dripped into the reaction pot. This was immediately followed by the addition of a $Pt^{0}$-tetravinylcyclotetrasiloxane complex (3.5% active $Pt^{0}$, 14 ppm $Pt^{0}$ based on the mass of compound 6, 0.124 g of Pt complex, Gelest) to the reactor. The dropwise addition of AGE was commenced. An exotherm was observed during the addition, which was complete after 30 minutes. The internal temperature of the reaction was maintained below 80° C. during the addition process. This temperature was easily controlled via the AGE addition rate and the application/removal of heat to the reaction vessel.

The reaction was stirred at 75° C. for 5 minutes after the addition was complete. FT-IR analysis indicated the reaction was incomplete, as judged by the presence of a SiH band (2119 $cm^{-1}$) in the IR spectrum. An additional 7 ppm (0.062 g of $Pt^{0}$ complex) charge of catalyst was added, an exotherm was observed, and the SiH IR absorbtion band decreased in intensity. Two more additions of catalyst (ca. 3 ppm each, 0.030 g $Pt^{0}$ complex) were made at 10-minute intervals. After this FT-IR analysis indicated the reaction was complete, as judged by the absence of a SiH band. The reaction was allowed to cool to room temperature, at which point activated carbon (~1.0 g) was slurried with the solution for 2 hours. The solution was filtered, and solvent was removed from the filtrate in vacuo to yield a yellow oil. The material was analyzed by $^{1}H$, $^{29}Si$, and $^{13}C$ NMR, GPC, MS and FT-IR. The spectral characteristics of the product were consistent with those expected of the hybrid epoxy compound 8. GPC analysis produced a single peak of low polydispersity (1.2). EI-MS analysis produced the expected primary molecular ion at 804 (calculated molecular ion of hybrid epoxy 8=806). Typical epoxy equivalent weight (EEW) was found to be ca. 590.

C. for 4 hours. FT-IR analysis indicated the reaction was complete, as judged by the absence of a SiH band (2119 $cm^{-1}$) in the IR spectrum. The reaction was allowed to cool to room temperature, at which point activated carbon (~0.5 g) was slurried with the solution for 1 hour. The solution was filtered, and solvent was removed from the filtrate in vacuo to yield a yellow oil of compound 9 (23.5 g, 95%). The radial hybrid copolymer was analyzed by $^{1}H$, $^{13}C$ and $^{29}Si$ NMR, and FT-IR spectroscopy.

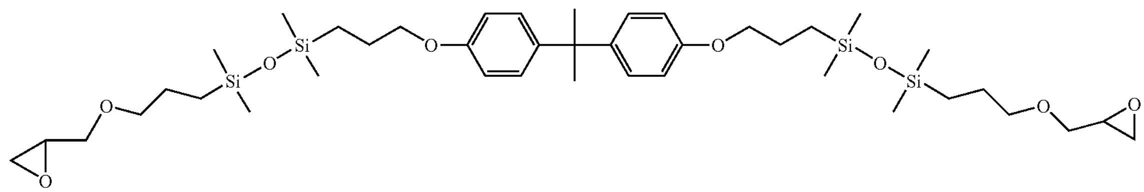

Linear Organic/Inorganic Hybrid Glycidyl Epoxy 8

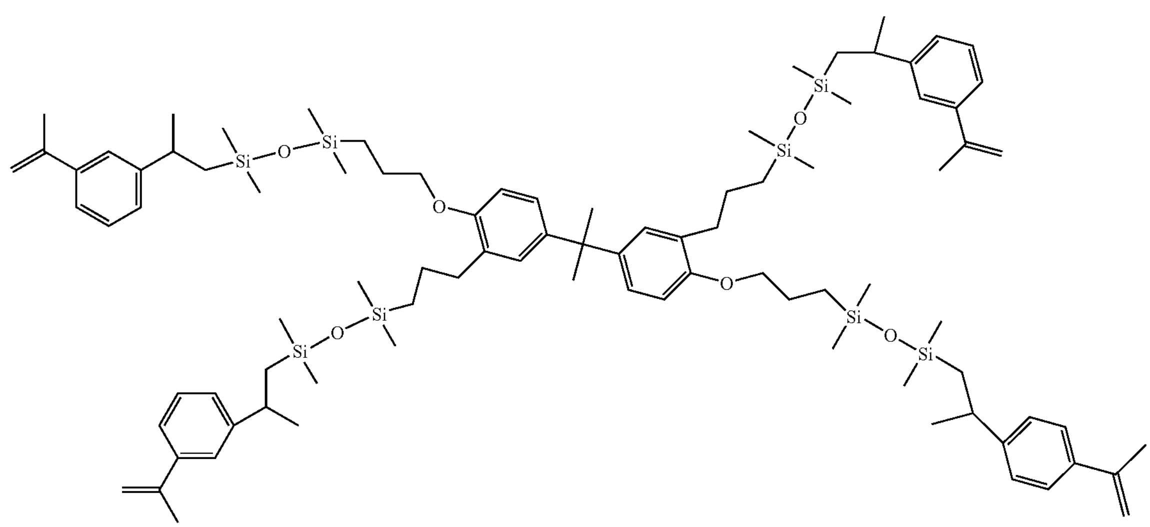

α-Methyl Styrene-Terminal Radial Hybrid Copolymer-G2

EXAMPLE 9

Synthesis of α-Methyl Styrene-Terminal Radial Hybrid Copolymer

A 250 mL four-necked round bottom flask was equipped with a reflux condenser, addition funnel, internal temperature probe and magnetic stirrer and placed under light nitrogen flow. The flask was charged with 1,3-diisopropenylbenzene (300 mL, 2.04 moles; Cytec) and warmed to an internal temperature of 65° C. Siloxane 1 (15.00 g, 16.20 mmol) was solvated in 1,3-diisopropenylbenzene (200 mL, 1.36 moles) and charged to the slow addition funnel. At an internal temperature of 65° C., $Pt^{0}$-tetravinylcyclotetrasiloxane complex (3.5% active $Pt^{0}$, 85 ppm $Pt^{0}$ based on the mass of compound 1, 0.042 g of Pt complex, Gelest) was added to the vessel, followed immediately by the addition of ~4 mL of siloxane 1 solution. No exotherm was observed. The internal temperature of the reaction was increased to 70–75° C. and the solution of siloxane 1 was added to the reaction over a period of 15 minutes. The reaction was held at 70–75°

EXAMPLE 10

Synthesis of Second Generation SiH-Terminal Radial Hybrid Copolymer

A 250 mL four-necked round bottom flask was equipped with a reflux condenser, addition funnel, internal temperature probe and magnetic stirrer and placed under light nitrogen flow. The flask was charged with 1,1,3,3-tetramethyldisiloxane (100 mL, 565 mmol; "TMDS"; Hanse Chemie) and warmed to an internal temperature of 65° C. Olefin-terminal hybrid copolymer 9 (11.0 g, 7 mmol) was solvated in TMDS (50 mL, 282 mmol ) and charged to the slow addition funnel. When the pot reached an internal temperature of 65° C., $Pt^{0}$-$D_{v}^{4}$ complex (3.5% active $Pt^{0}$, 50 ppm $Pt^{0}$ based on the mass of compound 9, 0.018 g of Pt complex, Gelest) was added to the vessel, followed immediately by the addition of ~4 mL of the copolymer 9-TMDS solution. The solution of 9 was added to the reaction over a period of 15 minutes. After the addition was completed, the reaction temperature was increased to 70–75° C. for 2 hours. The reaction was then allowed to cool to room temperature, at which point activated carbon (~0.5 g) was slurried with the solution for 2 hours. The solution was filtered, and solvent was removed from the filtrate in vacuo to yield a yellow oil (12.7 g, 95%). The $^{1}H$, $^{13}C$, and $^{29}Si$ NMR and FT-IR spectral characteristics of the product were consistent with those expected of the of SiH-terminal radial organic/inorganic hybrid copolymer 10. The titrated SiH value of the copolymer was 2.35 meq SiH/g resin.

10 (12.0 g, 5.72 mmol) solvated in toluene (20 mL). The pot temperature was raised to ~65° C. Vinylcyclohexene oxide ("VCHO", 2.84 g, 22.87 mmol) was charged to the addition funnel. Approximately 1 mL of this epoxy was dripped into the reaction pot.

$Pt^{0}$-$D_{v}^{4}$ complex (3.5% active $Pt^{0}$, 35 ppm $Pt^{0}$ based on the mass of compound 10, 0.014 g of Pt complex, Gelest) was added to the reaction vessel.

The VCHO was added dropwise to the reactor over a period of ~1 hour, maintaining an internal temperature less than 70° C. A steady reaction exotherm was observed during the addition. This temperature was easily controlled via the VCHO addition rate and the application/removal of heat to the reaction vessel.

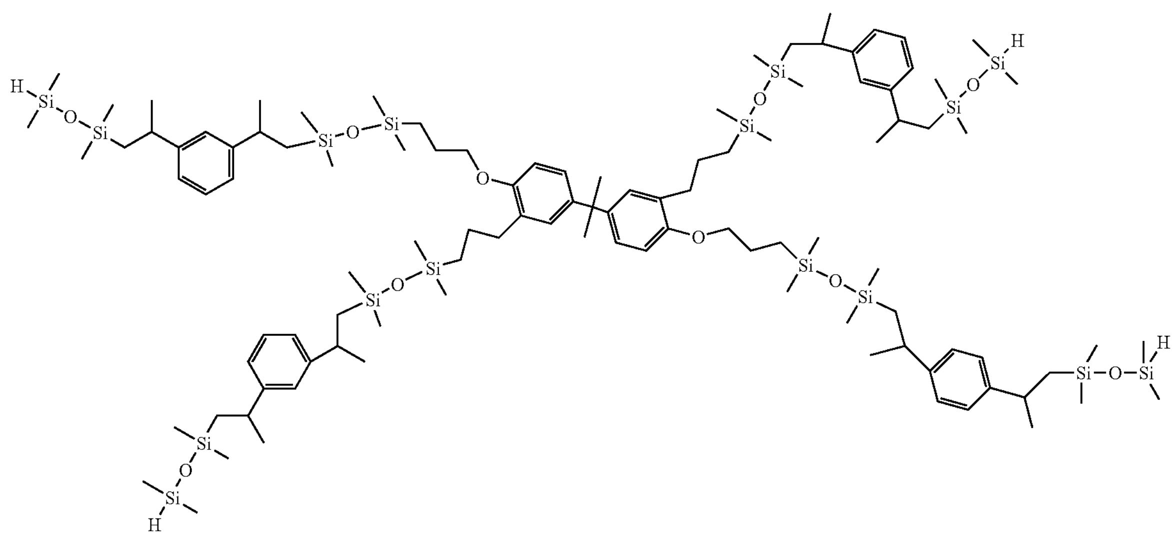

SiH-Terminal Radial Hybrid Copolymer-G2

EXAMPLE 11

Synthesis of Tetrafunctional Cycloaliphatic Epoxy Generation 2 Radial Siloxane/Hydrocarbon Hybrid Copolymer, 11

A 500 mL four-necked round bottom flask was equipped with a reflux condenser, addition funnel, internal temperature probe and magnetic stirrer and placed under light nitrogen flow. The flask was charged with radial copolymer The reaction was stirred at 70° C. for 2 hours after the addition was complete. FT-IR analysis indicated that the reaction was complete, as judged by the absence of a SiH band (2119 $cm^{-1}$) in the spectrum. The reaction was allowed to cool to room temperature, at which point activated carbon (~1.0 g) was slurried with the solution for 2 hours. The solution was filtered, and solvent was removed from the filtrate in vacuo to yield a yellow oil (13.6 g, 92%) The $^{1}H$ NMR, $^{13}C$ NMR, $^{29}Si$ NMR and FT-IR spectral characteristics of the product were consistent with those expected of the radial hybrid epoxy compound 11. The EEW of the resin was found to be 573 g resin/mol epoxy.

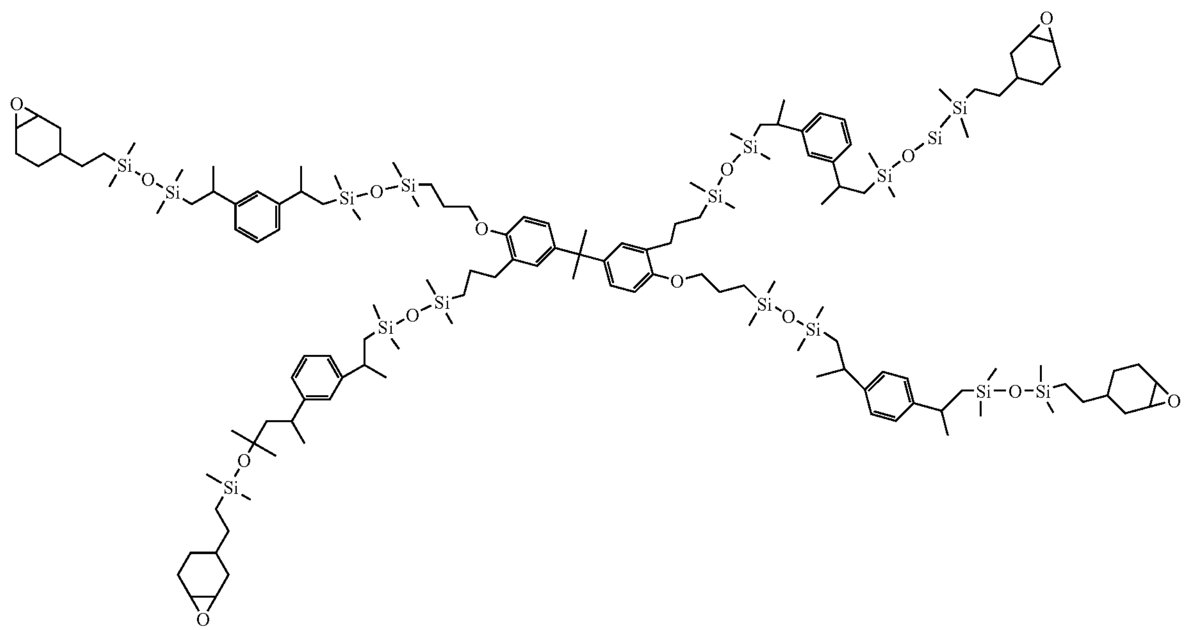

TBPASiCHO-G2

EXAMPLE 12

Synthesis of G1-Olefin-Terminal Hybrid Radial Copolymer Using an Inorganic Core

Dicyclopentadiene ("DCPD", 40 eq.) is solvated in toluene in a round bottomed flask equipped with an addition funnel, reflux condenser, magnetic stirring and internal temperature probe under a dry air purge. The addition funnel is charged with tetrakis(dimethylsilyl)siloxane ("TDS", 1 eq.). The reaction pot solution is warmed to 50° C., at which point dichloroplatinum bis(dicyclopentadiene) ($Cl_2PtCOD_2$, 20 ppm based on TDS) was added to the solution. The internal reaction temperature was raised to 70° C., and the TDS was added dropwise to the reaction maintaining an internal temperature less than 80° C. After the addition was complete, the solution was stirred for 10 min. at temperature, at which point FT-IR analysis indicated the complete consumption of the SiH functionality. The excess DCPD and toluene were removed in vacuo, to yield a pale yellow oil.

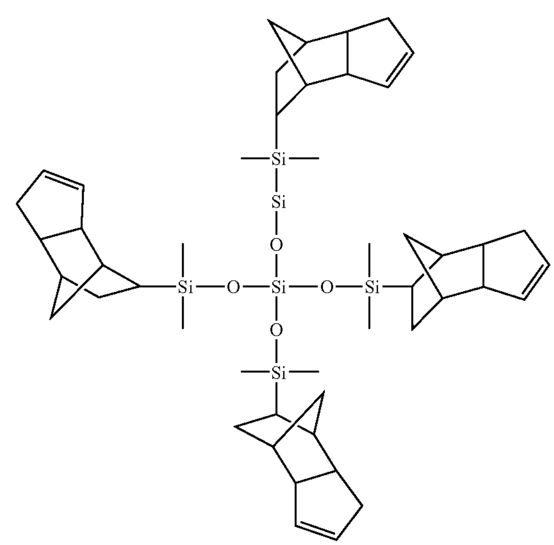

EXAMPLE 13

Synthesis of G1-SiH-Terminal Hybrid Radial Copolymer with an Inorganic Core 1,1,3,3-tetramethyldisiloxane ("TMDS", 40 eq.) is charged to a 500 mL 4-necked flask equipped with mechanical stirring, reflux condenser, addition funnel, and internal temperature probe under a slow purge of dry air. Compound 12 (1 eq.) is charged to the addition funnel. The reaction is placed in an oil bath and warmed to an internal temperature of 50° C. $Cl_2Pt(COD)_2$ (20 ppm based on the mass of compound 12) is added to the reaction pot, and the internal temperature is raised to 75° C. Compound 12 is added to the reaction drowise over the course of 30 min., maintaining an internal temperature between 75–85° C. The reaction is stirred for 20 min. at 80° C. after the addition is completed. The excess TMDS is removed in vacuo and recycled to yield compound 13 as a pale yellow oil.

EXAMPLE 14

Synthesis of G1-Cycloaliphatic Epoxy-Terminal Hybrid Radial Copolymer with an Inorganic Core Compound 13 (1 eq.) is solvated in toluene (50 wt. % solution) in a 500 mL four-necked round bottom flask equipped with mechanical stirring, addition funnel, and internal temperature probe under a purge of dry air. The addition funnel is charged with vinylcyclohexene oxide ("VCHO", 4 eq.). The pot temperature is raised to 50° C., at which point $Cl(PPh_3)_3Rh$ (20 ppm based in the mass of compound 13) is added to the reaction solution. The internal reaction temperature is raised to 70° C., and the VCHO is added dropwise over the course of 20 min. maintaining an internal temperature less than 80° C. during the addition. The reaction is stirred at 75° C. for 10 minutes after the addition is complete, at which time the FT-IR spectrum of the reaction mixture indicates complete disappearance of the 2120 $cm^{-1}$ band corresponding to the SiH groups of starting material 13. Solvent is removed in vacuo to yield product 14 as a pale yellow oil.

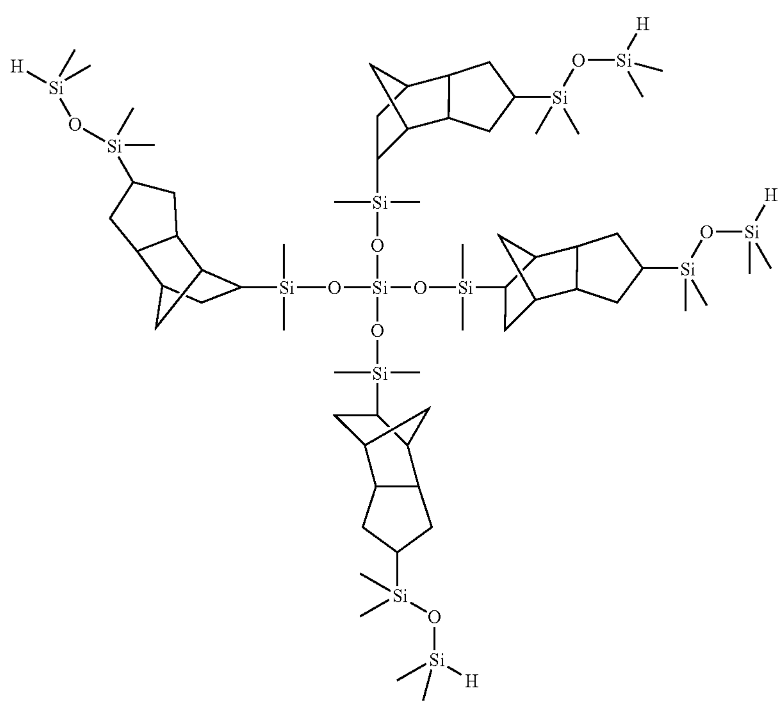

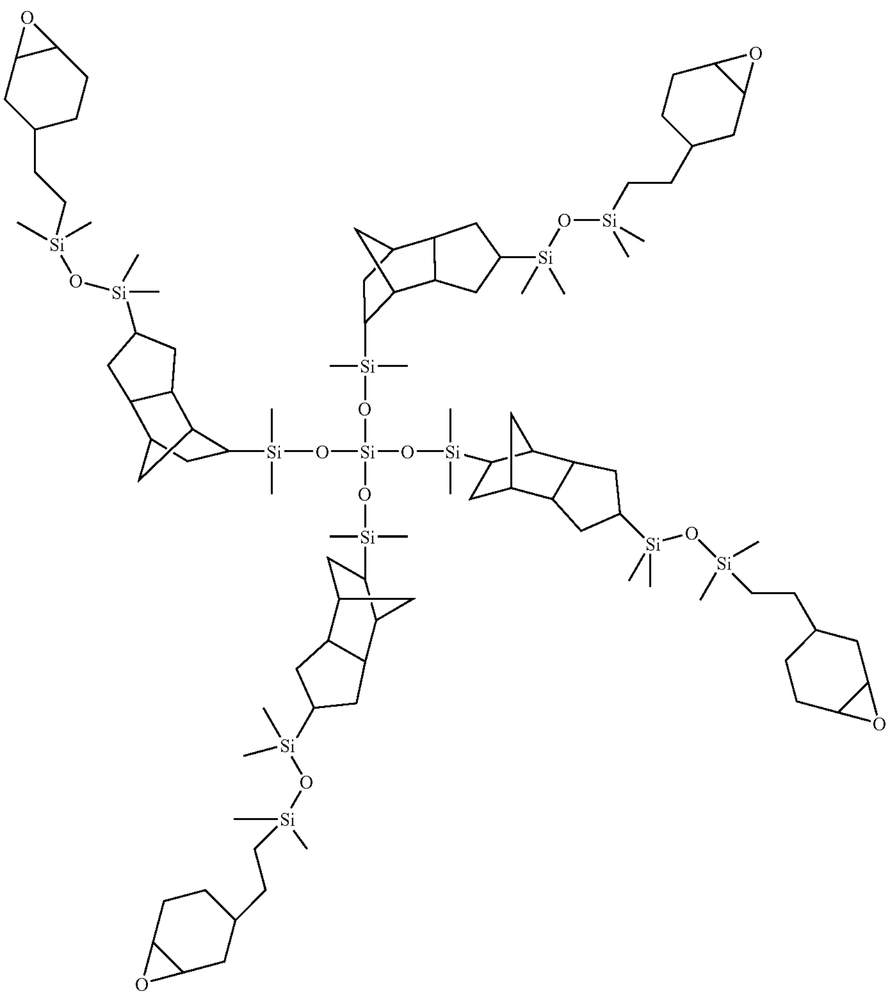

EXAMPLE 15

DVS Moisture Uptake Comparison of Hybrid Epoxies and Common Hydrocarbon Epoxy Resins To compare the hydrophobicity of thoroughly cured materials, Dynamic Vapor Sorbtion (DVS) was used to measure the saturation moisture uptake level cured samples subjected to conditions of 85° C., 85% relative humidity. The various epoxy resins tested were formulated with 1 wt. % Rhodorsil 2074 cationic photo/thermal iodonium salt initiator (Rhodia), cast into 1 mm thick molds, and cured at 175° C. for 1 h. Cured samples were then placed in the test chamber of the DVS instrument and tested until moisture uptake (mass gain) ceased. Key results are summarized in Table 1.

As can be seen from this data, the hybrid epoxies absorb significantly less moisture at saturation than representative hydrocarbon epoxies, exemplifying their high hydrophobicity relative to such common carbon-based epoxy resins (EPON 828 and ERL 4221). In addition, it can be seen that the radial, tetrafunctional hybrid epoxies (2 & 4) are slightly more hydrophobic than similar linear, difunctional analogs (7 & 8).

TABLE 1

Saturation Moisture Uptake Comparison.

| Epoxy | Mass Gain at Saturation (%) | Comments |
|---|---|---|
| Epon 828[a] | 1.85 | brittle, hard, tan color |
| ERL 4221[b] | 5.19 | very brittle, tan color |
| TBPASiCHO-G1-Siloxane, 2 | 0.42 | pliable, tan color |
| TBPASiCHO-G1-Silane, 4 | 0.35 | pliable, tan color |
| BPASiCHO, 7 | 0.65 | flexible, tan color |
| BPASiGE, 8 | 0.87 | flexible, tan color |

[a]Shell Chemical
[b]Union Carbide

EXAMPLE 16

Thermal Stability of Inventive Hybrid Epoxies Relative to Commercial Epoxy Resins Exemplary inventive hybrid resins were tested for thermal stability vs. typical commercial hydrocarbon epoxy materials. Samples were analyzed both as uncured liquid materials and as cured solids. All cured samples were obtained via formulation of the various resins with 0.5 wt. % Rhodorsil 2074 (Rhodia) cationic thermal/photoinitiator and curing at 175° C. for 1 h. Cured and uncured samples were then analyzed by TGA according to the following heating profile: 30° C.–300° C. at a heating rate of 20° C./min., followed by a soak at 300° C. for 30 min. Table 2 lists the temperatures at which each material lost 1% and 10% of its mass, as well as the total mass lost by each at the completion of the full thermal profile.

TABLE 2

TGA Comparison of Radial Hybrid vs. Hydrocarbon Epoxies

| Sample | Uncured Temp. (° C.) @1% wt loss | Uncured Temp. (° C.) @10% wt loss | Uncured Remaining Wt. (%) after 300° C./ 30 min | Cured Temp. (° C.) @10% wt loss | Cured Temp. (° C.) @10% wt loss | Cured Remaining Wt. (%) after 300° C./ 30 min |
|---|---|---|---|---|---|---|
| EPON 828 | 206 | 249 | 11 | 149 | 279 | 46 |
| ERL-4221 | 119 | 167 | 1.4 | 143 | 279 | 50 |
| BPASiGE, 8 | 135 | 265 | 44 | 203 | 295 | 83 |
| BPASiCHO, 7 | 182 | Over 300 | 77 | 219 | 300 | 79 |
| TBPASiCHO-G1-Siloxane, 2 | 244 | Over 300 | 96 | 248 | 300 | 78 |
| TBPASiCHO-G1-Silane, 4 | 270 | Over 300 | 97 | 208 | 295 | 80 |

As can easily be deduced by the data shown in Table 2, the radial hybrid epoxy resins (both uncured and cured) exhibit significantly improved thermal stability relative to prototypical commercial hydrocarbon analogs. This is due to the inorganic nature of the siloxane or silane portions/blocks of the hybrid materials.

EXAMPLE 17

Compatibility of the Inventive Hybrid Epoxies in Commercial Hydrocarbon and Siloxane Resins The representative radial hybrid epoxy 2 was tested for compatibility with selected relevant hydrocarbon and siloxane resins. Compatibility was qualitatively judged by the clarity of the initial mixture, as well as the stability of the mixture once formed. Results are shown in Table 3. All blends are expressed in terms of weight percents.

TABLE 3

Compatibility of Radial Hybrid Epoxies in Hydrocarbon and Siloxane Resins.

| Resin Blend Composition | Initial Clarity | Mixture Stability | Comments |
|---|---|---|---|
| 50% Hybrid Epoxy 2, 50% Sycar ® Siloxane | Clear | clear after 72 h/r.t. | Two resin are essentially completely miscible |
| 2% Hybrid Epoxy 2, 98% ERL 4221 | clear | clear after 72 h/ r.t. | Two resin are macroscopically miscible |
| 5% Hybrid Epoxy 2, 95% ERL 4221 | clear | clear after 72 h/r.t. | Two resin are macroscopically miscible |
| 10% Hybrid Epoxy 2, 90% ERL 4221 | clear | clear after 72 h/r.t. | Two resin are macroscopically miscible |
| 2% Hybrid Epoxy 2, 98% Epon 828 | hazy | hazy after 72 h/r.t.; no change from initial appearance | Blend is hazy, but no apparent bulk separation |
| 5% Hybrid Epoxy 2, 95% Epon 828 | hazy | hazy after 72 h/r.t.; no change from initial appearance | Blend is hazy, but no apparent bulk separation |
| 10% Hybrid Epoxy 2, 90% Epon 828 | cloudy | cloudy after 168 h/r.t;. no change from initial appearance | Blend is cloudy, but no bulk separation observed |
| 80% Hybrid Epoxy 2, 20% Liquid Maleimide/Vinyl Ether Blend | trace haze | trace haze after 72 h/r.t.; no change from initial appearance | Resin system is compatible on a macroscopic scale |
| 90% Hybrid Epoxy 2, 10% CHVE Vinyl Ether (ISP) | clear | clear | Two resins are compatible in most proportions |
| 80% Hybrid Epoxy 2, 20% CHVE Vinyl Ether (ISP) | clear | clear | Two resins are compatible in most proportions |
| 90% Epon 828, 10% EMS-232 (Gelest) | cloudy | bulk phase separation within 60 h/r.t. | Bulk phase separation clearly observed |

As can be seen from the data, the radial hybrid epoxy 2 exhibits miscibility on the macroscopic scale with various hydrocarbon resins such as ERL-4221 and CHVE. It is also highly compatible with certain siloxane resins such as the Sycar® siloxane resin. Mixtures up to ~10 wt. % with Epon 828 exhibit some haziness, but bulk phase separation is not observed at room temperature (or after subsequent curing). The last entry in the table demonstrates that a typical commercially available epoxysiloxane, EMS-232 (the product resulting from the hydrosilation of a common methylhydro-dimethylsiloxane copolymer with vinyl cyclohexene oxide, Gelest), exhibits bulk phase separation from many hydrocarbon epoxies, such as Epon 828, over the course of a few days at room temperature.

EXAMPLE 18

Flexibilization of UV and Thermally Cured Formulations (of Epon 828+Inventive Coplymers)

Because of their improved compatibility with hydrocarbon-based materials, many of the inventive hybrid epoxies can be effectively used to flexibilize common epoxy thermosets. Thus, blends were made of Epon 828 and radial hybrid epoxy 2 in several ratios. These blends were combined with 1 wt. % cationic polymerization initiator (Rhodorsil 2074 iodonium salt), cast into films of approximately 10 mil wet thickness with a drawdown bar, and thermally cured at 175° C. for 1 hour. The resulting cured films were analyzed by dynamic mechanical analysis (Ares RSA, 1 Hz frequency, −100° C.–250° C.) to determine modulus at various temperatures and $T_g$. Pertinent data is summarized in Table 4 below.

As can be seen from the data, the elastic modulus (E') of the various films below their $T_g$ decreased, as expected, as the relative amount of hybrid epoxy 2 (TBPASiCHO-G1-siloxane) was increased. Clearly, the $T_g$ of the cured matrices decreased as the relative amount of hybrid epoxy 2 was increased as well. Also notable is the fact that one distinct $T_g$ is observed in all cases which, in the case of the blends, indicates material homogeneity on the macroscopic scale. If phase separation had occurred (due to poor hydrocarbon compatibility of the hybrid epoxy component, for example), two $T_g$s representing the two homopolymer networks would be expected to have been observed.

Thus, many of the inventive hybrid epoxies, such as compound 2, can be used to flexibilize typical hydrocarbon epoxy matrices. This is due to the improved organic compatibility of the inventive hybrid copolymers as well as the inherent flexibility imparted to the compounds by the inorganic siloxane segments of the materials.

TABLE 4

DMA Analyses of Hydrocarbon/Hybrid Epoxy Blends

| Epoxy/blend | ~E'@-50° C. (× $10^{-9}$ Pa) | ~E'@25° C. (× $10^{-9}$ Pa) | ~$T_g$ (° C.) |
|---|---|---|---|
| 100% Epon 828 | 2.1 | 2.0 | 190 |
| 95:5 Epon 828:2 | 2.0 | 1.8 | 180 |
| 90:10 Epon 828:2 | 1.5 | 1.0 | 165 |
| 100% TBPASiCHO-G1-siloxane 2 | 1.1 | 1.0 | 80 |

EXAMPLE 19

Cationic UV Curing of Radial Hybrid Epoxy 2

The cycloaliphatic epoxysiloxane of example 2 (TBPA-SiCHO-G1-siloxane 2, 3.0 g) was formulated with 1 wt. % of the iodonium borate cationic photoinitiator Rhodorsil 2074 (0.03 g Rhodia) and isopropylthioxanthone (0.0075 g (equimolar amount with respect to the Rhodorsil photoinitiator, First Chemical). A sample of this formulation (2.1 mg) was analyzed by differential photocalorimetry ("photoDSC"), the results of which are shown in FIG. 1.

The formulation cures significantly faster than typical cationically cured epoxies, with the peak exotherm occurring after 0.13 minutes. Based on the enthalpy of photopolymerization (−147 J/g), the conversion of the system was ca. 56% even under the low intensity conditions utilized in the photo DSC.

EXAMPLE 20

Acceleration of The UV Curing of a Prototypical Glycidyl Epoxy (Epon 828)

Three formulations were made consisting of the following:

Formula 1: Epon 828 (Shell)+1 wt. % Rhodorsil 2074 (Rhodia)

Formula 2: Radial hybrid epoxy 2+1 wt. % Rhodorsil 2074

Formula 3: 10:90 blend of hybrid epoxy 2:Epon 828+1 wt. % Rhodorsil 2074

Figure 2:
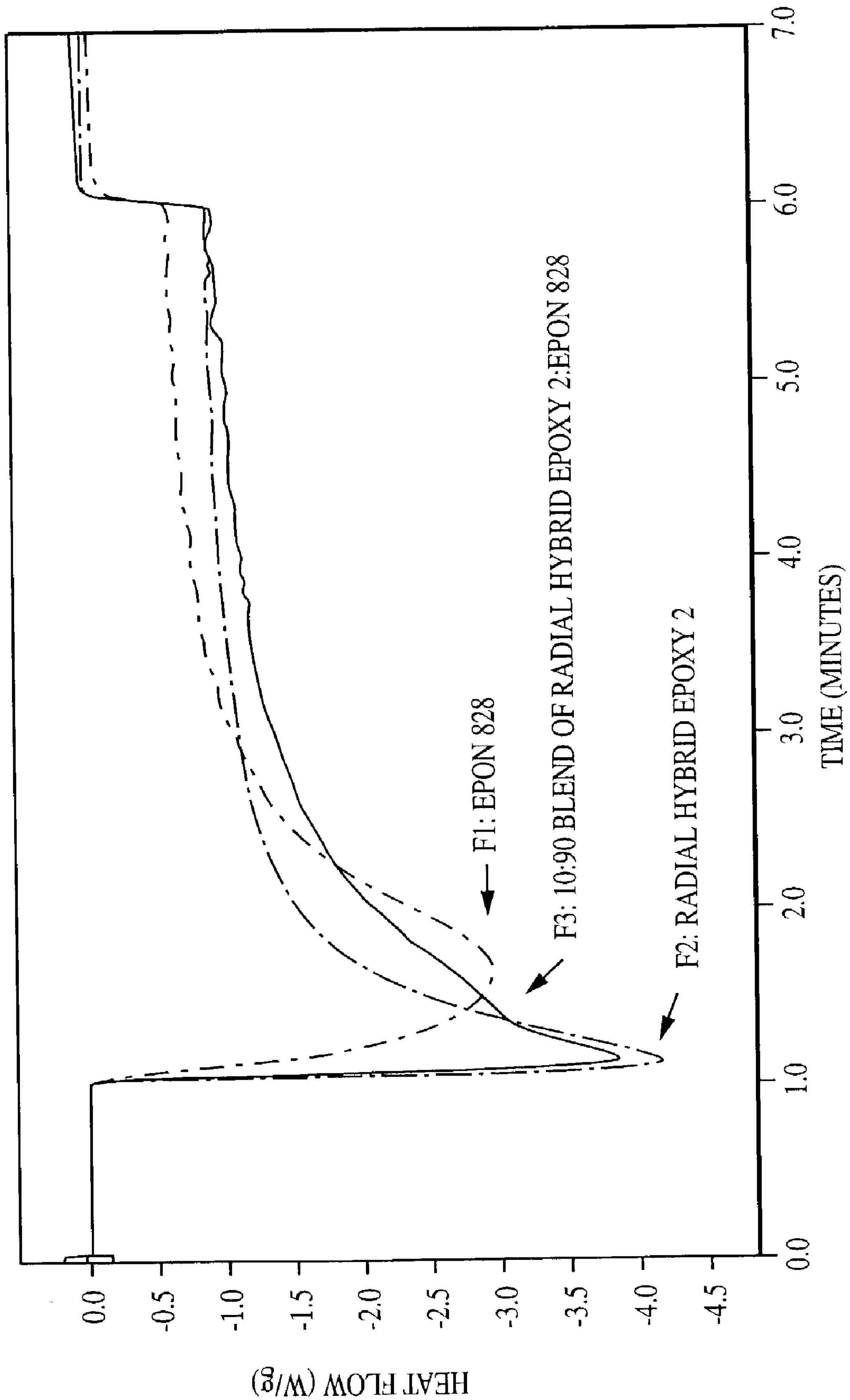
FIG. 2 is a photo DSC of the accelerated UV cure of EPON 828.

The three formulations were analyzed using differential photocalorimetry ("photoDSC"). As is known to those skilled in the art, the glycidyl epoxy (Formula 1) exhibited a broad curing exotherm indicative of poor UV curing kinetics (time to peak exotherm ~0.8 minutes), and relatively low UV curing conversion (~34%). Similar to the data given in example 19, radial hybrid epoxy 2 (Formula 2) exhibited very good UV curing kinetics (sharp exotherm peak, time to peak exotherm ~0.13 minutes) and good conversion during the UV curing process (~>60%). The 10:90 w/w blend of these two epoxies (Formula 3) exhibited both a sharp exotherm (time to peak exotherm ~0.13 minutes) and acceptable chemical conversion upon irradiation (~45%). These results are illustrated in FIG. 2. Thus, small amounts of the inventive radial hybrid epoxy of example 2 can be blended with typical hydrocarbon epoxies, like Epon 828, to significantly improve their UV curing kinetics and conversions. An enabling aspect of this phenomena is the fact that the inventive hybrid epoxies exhibit improved compatibility with hydrocarbon epoxy resins relative to the epoxysiloxanes known in the prior art.

EXAMPLE 21

Cationic UV Cure of Hybrid Epoxy 2/Vinyl Ether Blends

The hybrid epoxies discussed herein can be combined with other reactive materials (not just other epoxies) due to their generally improved hydrocarbon compatibility. Thus, radial hybrid epoxy 2 was formulated with CHVE (ISP), and UV9380C cationic photoinitiator (GE Silicones) as follows:

Radial hybrid epoxy 2: 88.5 parts by weight

CHVE: 10 parts by weight

UV9380C: 1.5 parts by weight

Figure 3:
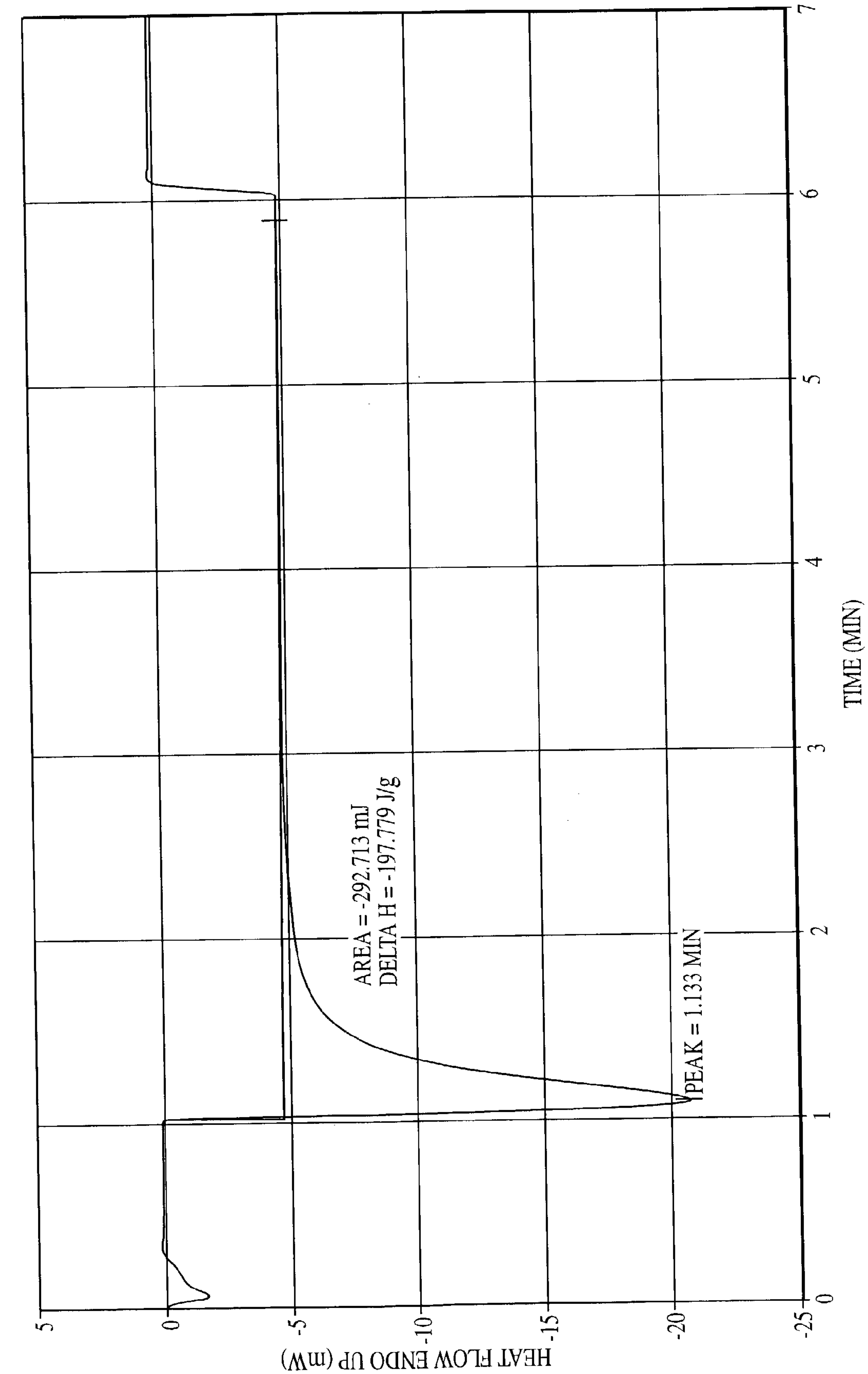
FIG. 3 is a photo DSC of a hybrid epoxy/vinyl ether blend.

This formulation was analyzed by photoDSC and found to be highly reactive when UV cured. The photoDSC data is shown in FIG. 3. The time to peak exotherm was found to be 0.13 minutes and the enthalpy of polymerization was determined to be 198 J/g, which corresponds to approximately 70% conversion even at the low light intensities present in the photoDSC (~22 mW/$cm^2$ broadband irradiance). Cured films of this formulation were clear, indicating no macroscopic phase separation and good compatibility of the radial hybrid epoxy and the CHVE vinyl ether.

EXAMPLE 22

Amine Cured Composition Containing Radial Hybrid Epoxy 5

Figure 4:
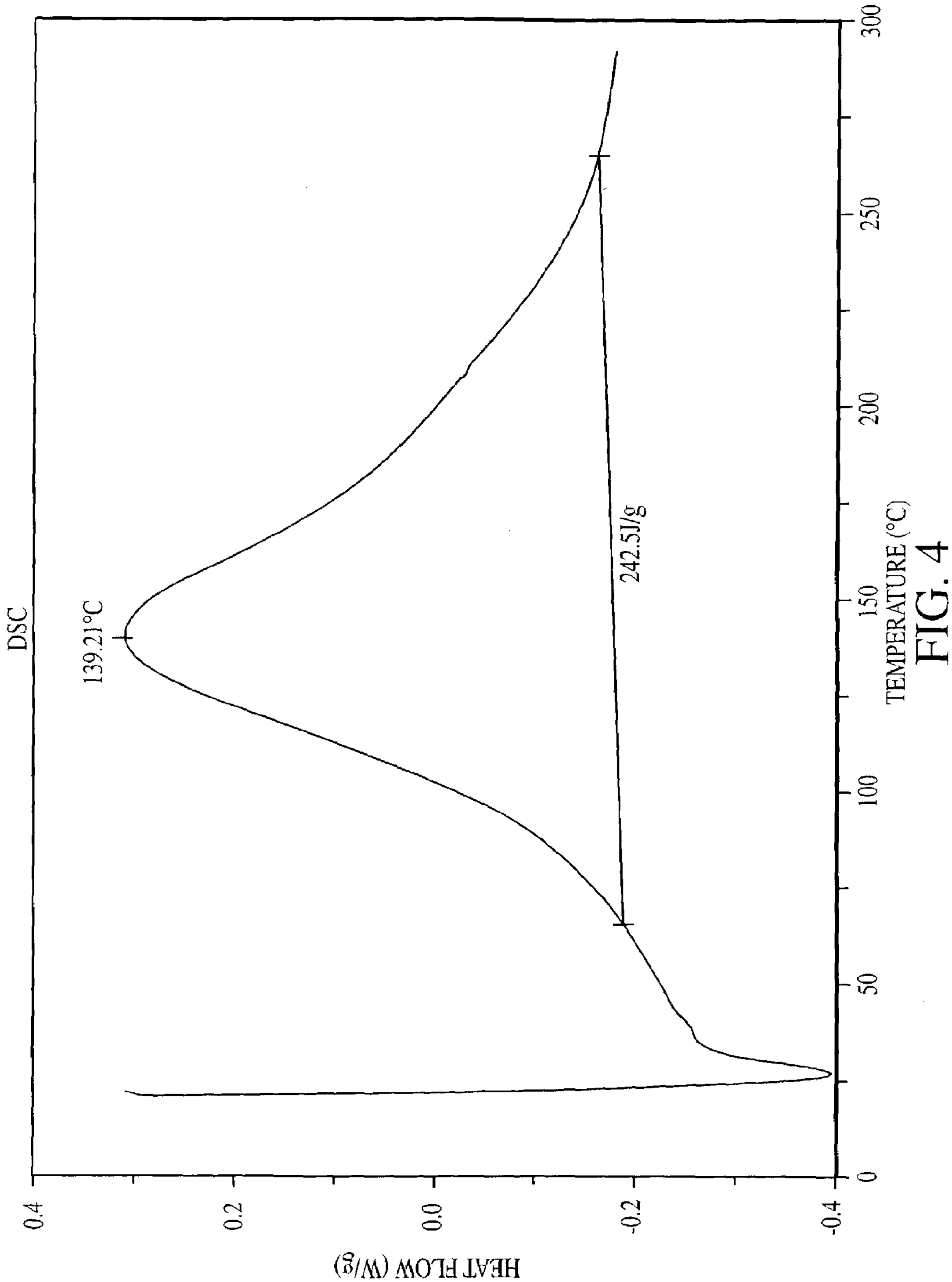
FIG. 4 is a DSC of an amine cured radial hybrid epoxy 5.

The hybrid epoxies of the current invention may be thermally cured using various curing agents known to those skilled in the art. For example, the radial hybrid glycidyl-type epoxy 5 was combined with 5 wt. % diethylenetriamine (DETA) and thermally cured in a DSC experiment. The formulation exhibited a large curing exotherm which peaked at 139° C. when the formulation was heated at a rate of 10° C./minute. The enthalpy of polymerization was 268 J/g. These results are illustrated in FIG. 4.

EXAMPLE 23

Thermal Cationic Curing of Radial Hybrid Epoxy 2

Figure 5:
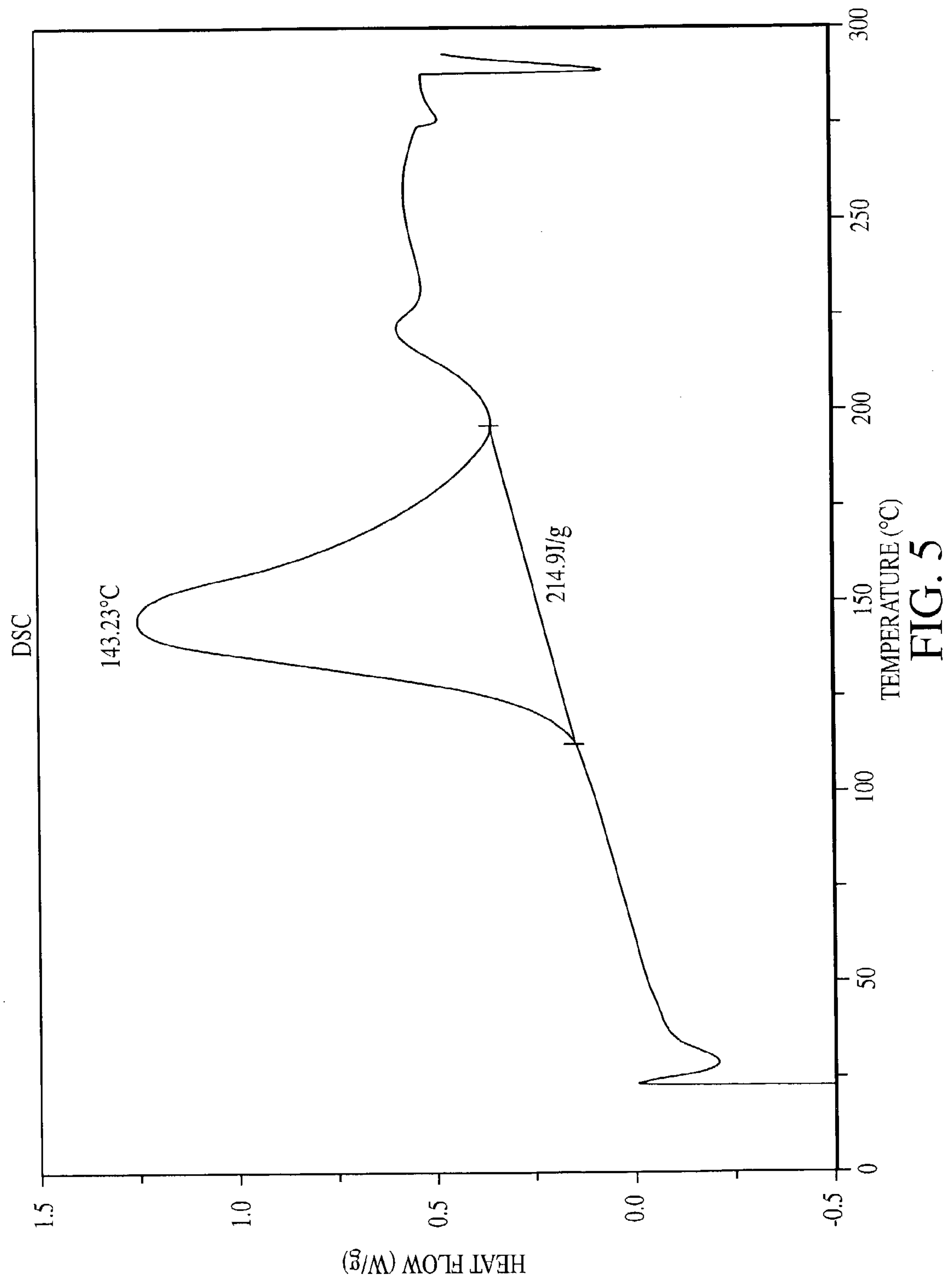
FIG. 5 is a DSC of cationically cured radial hybrid epoxy 2.

The hybrid cycloaliphatic epoxy described in example 2 was blended with 1 wt. % Rhodorsil 2074 (Rhodia) to produce a clear formulation. This mixture was thermally cured in a DSC (note iodonium salts can typically be used as cationic thermal—as well as photoinitiators). As can be seen from FIG. 5, the formulation underwent an extensive cationic curing process (enthalpy of polymerization=214 J/g) with peak exotherm occurring at 143° C.

EXAMPLE 24

UV Curable Composition of Olefin-Terminal Radial Hybrid Copolymer 9 with a Liquid Maleimide Resin The olefin-terminal hybrid radial copolymers disclosed in the current invention may be used as reactive resins in various ways obvious to those skilled in the art. Thus, typical radical or cationic thermal- or photoinitiators may be utilized to affect the polymerization, or copolymerization of these unsaturated hybrid copolymers. For example, it is well-known that various "electron-rich" (donor) olefins (such as vinyl ethers, vinyl amides or styrenic derivatives) undergo efficient photoinitiated copolymerizations with "electron poor" (acceptor) olefinic materials such as maleimides, fumarate esters or maleate esters.

Figure 6:
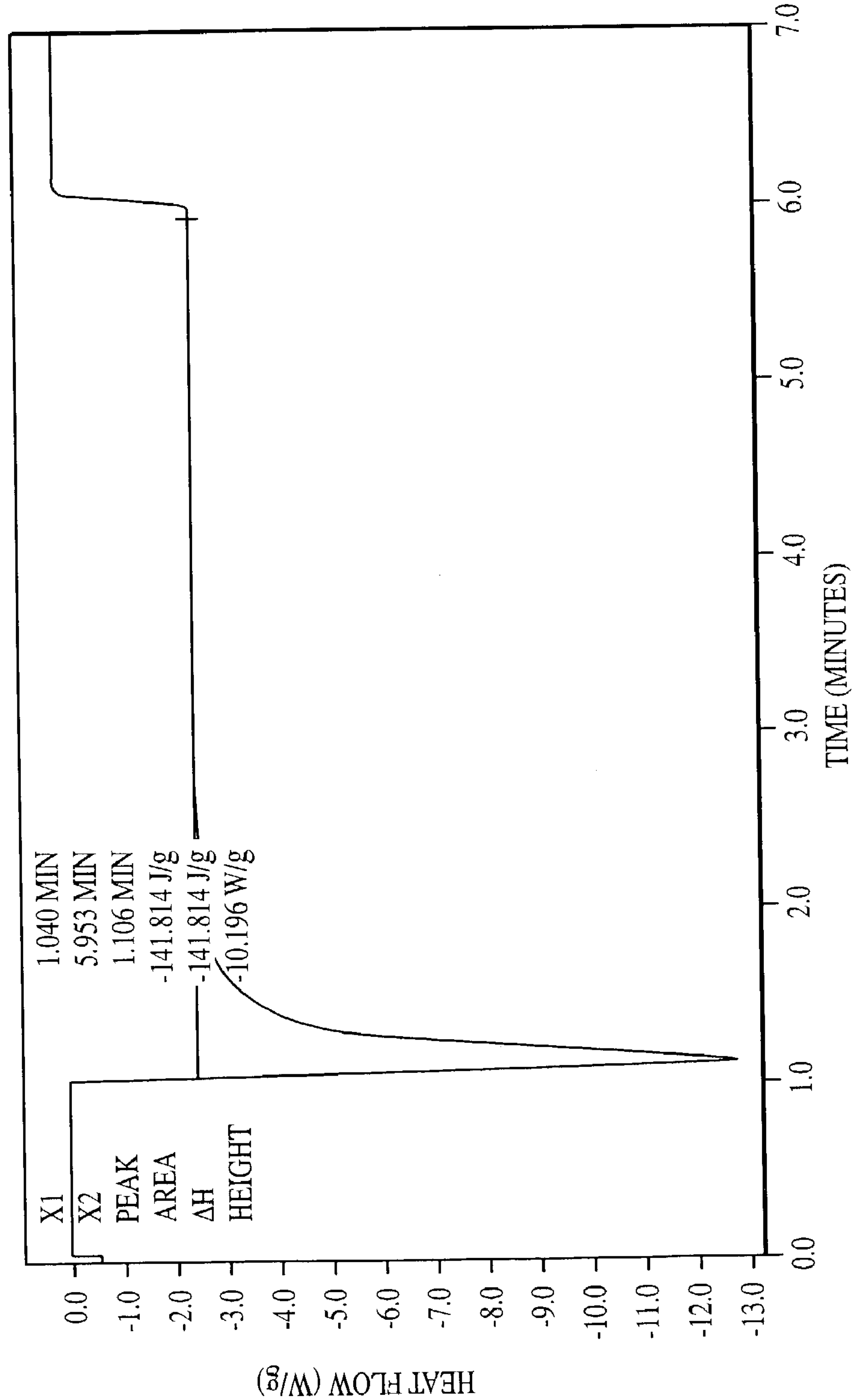
FIG. 6 is a photo DSC of UV cured radial hybrid copolymer 9 with a liquid maleimide resin.

Thus, the olefin-terminal radial hybrid copolymer 9 of Example 9 was blended with an equimolar portion (equal moles of donor and acceptor double bonds) of the liquid bismaleimide as described in Example B of U.S. Pat. No. 6,256,530 and 2 wt. % Irgacure 651 photoinitiator (Ciba Specialty Chemicals). This formulation was analyzed by differential photocalorimetry ("photoDSC"). As can be clearly seen in FIG. 6, the formulation underwent a rapid (time to peak exotherm=0.11 minutes) and extensive (enthalpy of photopolymerization=142 J/g) photocuring reaction when irradiated with the light output of a medium pressure mercury lamp used in the photoDSC instrument.

EXAMPLE 25

Figure 7:
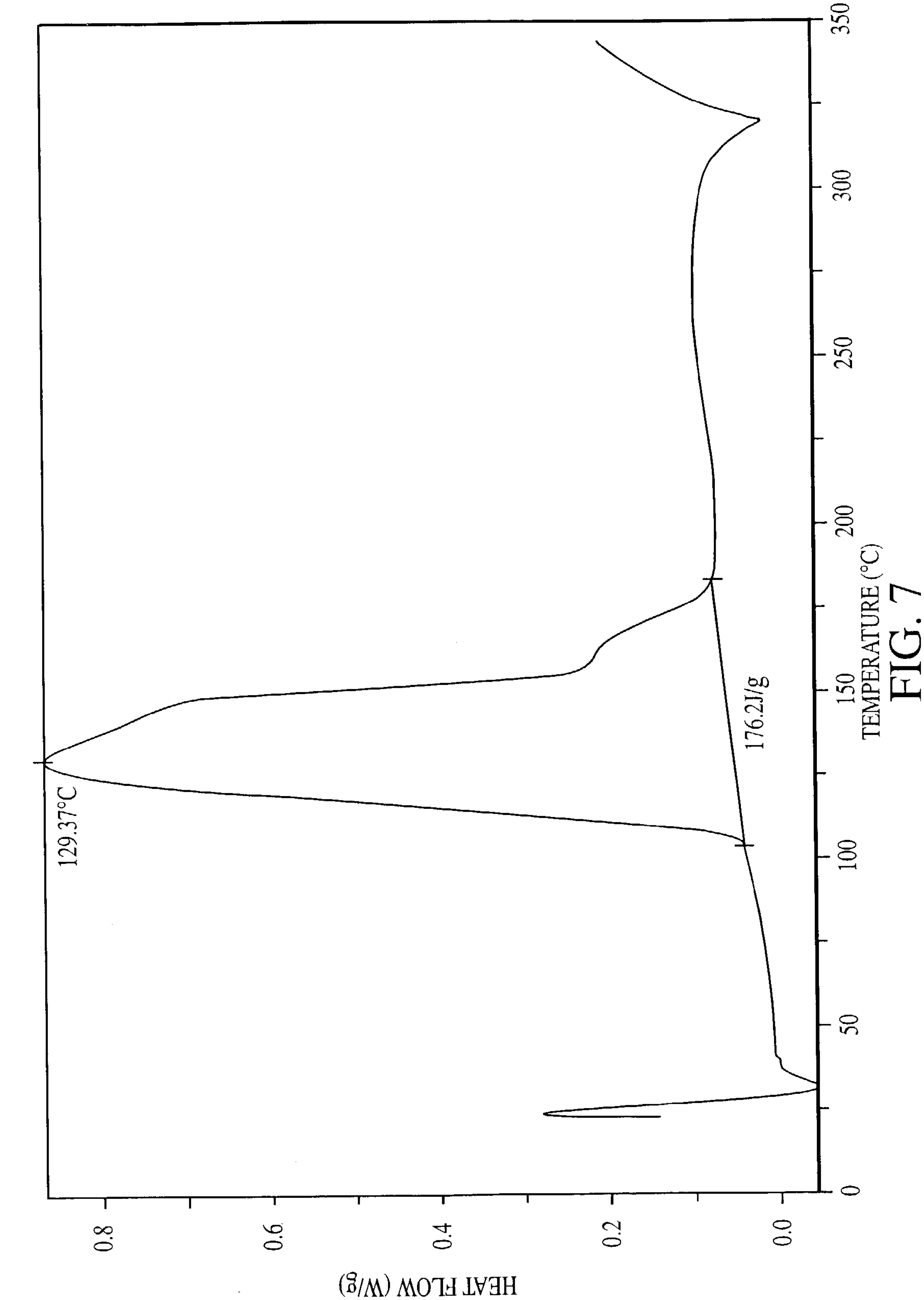
FIG. 7 is a DSC of thermally cured radial hybrid copolymer 9 with a liquid maleimide resin.

Thermally Curable Composition Comprising Olefin-Terminal Radial Hybrid Copolymer 9 with Liquid Maleimide Resin The "donor/acceptor formulation" discussed in example 24 above can also be readily thermally cured by replacing the photoinitiator component with a thermal curing agent. Thus, a formulation identical to that presented in example 24 was made in which the Irgacure 651 photoinitiator was replaced with 2 wt. % USP90 MD peroxide thermal initiator (Witco). This mixture was cured in a DSC instrument. As can clearly be seen from FIG. 7, the formulation underwent a rapid and extensive thermal polymerization.

EXAMPLE 26

Thermal Cationic Curing of Olefin-Terminal Radial Hybrid Copolymer 9

Figure 8:
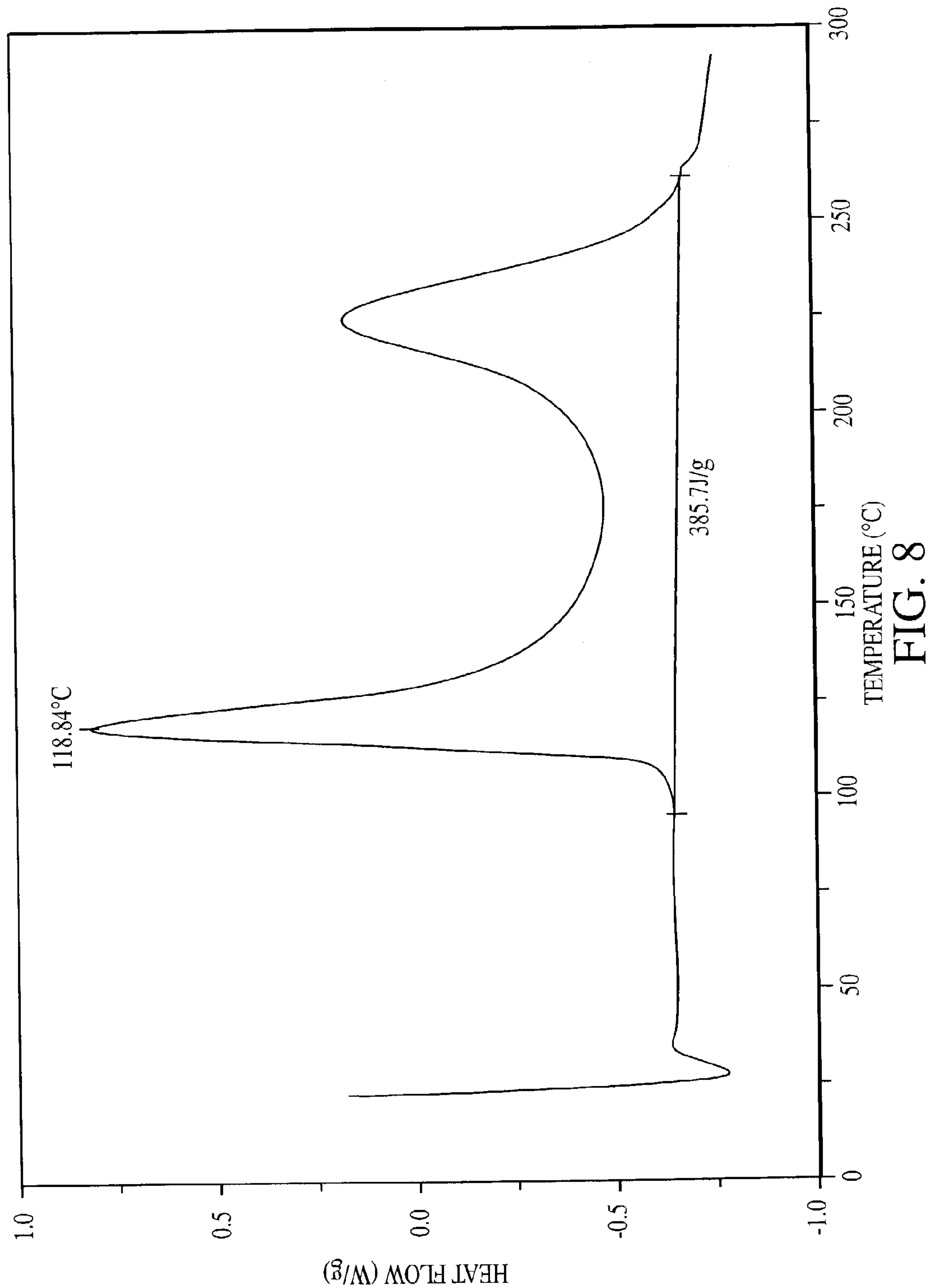
FIG. 8 is a DSC of the thermal cationic curing of hybrid copolymer 9.

The radial hybrid copolymer 9 was formulated with 2 wt. % Rhodorsil 2074 iodonium borate salt. This formulation was thermally cured in a DSC to produce the data presented in FIG. 8 (iodonium salts are effective thermal (as well as photo) initiators of cationic polymerizations). Clearly the formulation polymerized extensively; the enthalpy of polymerizationn was found to be 386 J/g. The origin of the bimodal exotherm observed is currently unknown.

EXAMPLE 27

Use of Tetrasilane 3 as a Crosslinker for an Addition Cure Thermoset

Figure 9:
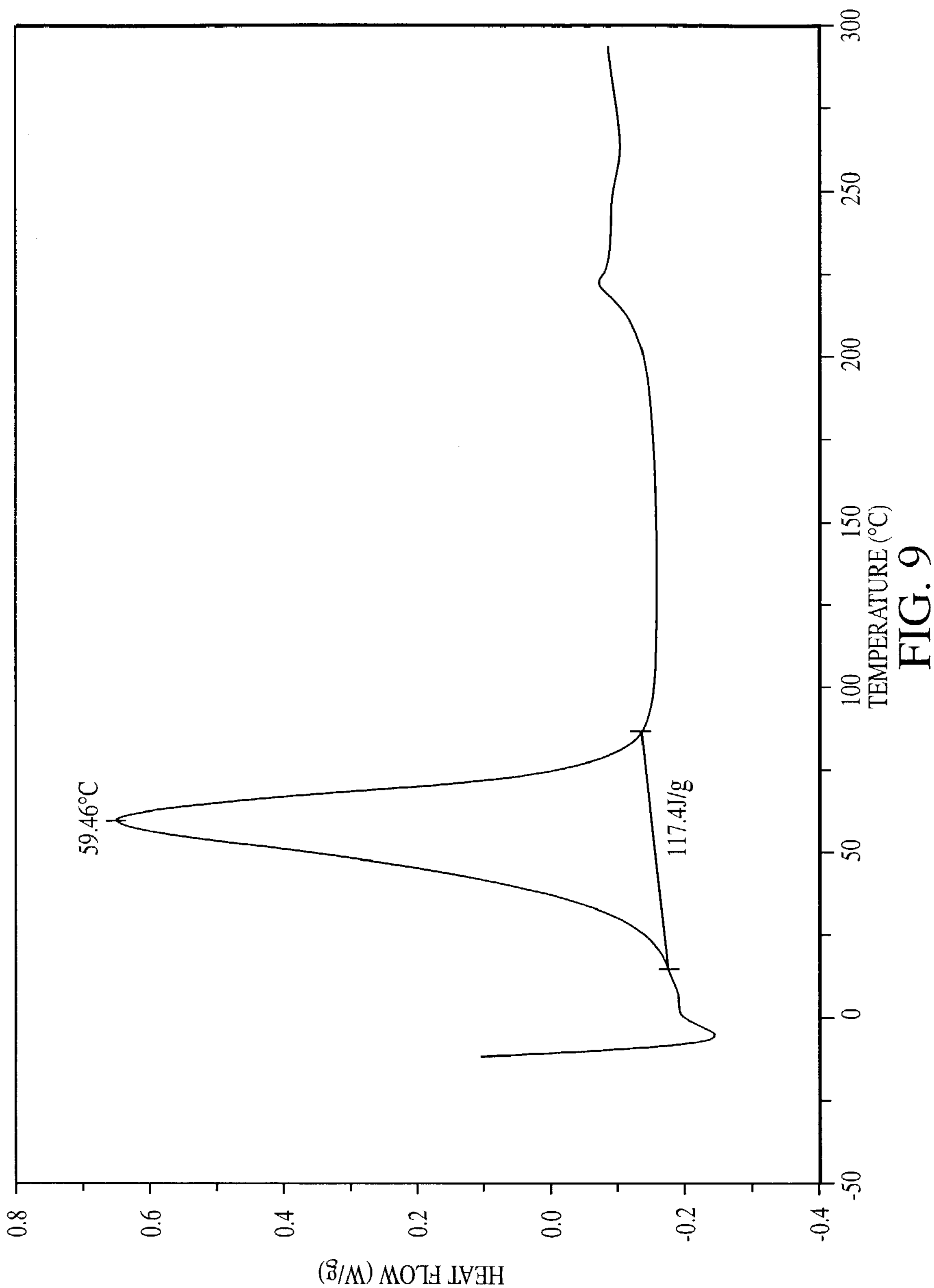
FIG. 9 is a DSC of an addition cure silicone utilizing radial silane 3.

The SiH-functional intermediates disclosed herein can be used as components of hydrosilation cure thermoset systems. For example, tetrasilane 1 can be utilized as a crosslinker for vinyl siloxane resins. The formulation detailed below was analyzed by DSC (thermal ramp rate 10° C./min) and found to cure rapidly and extensively. The results of the analysis are illustrated in FIG. 9.

Formula:

vinyl-terminal poly(dimethylsiloxane) (DMS-V05, Gelest): 4.0 g (ca. 5.19 mmol vinyl functionality)

tetrasilane 1: 2.4 g (ca. 5.19 mmol SiH functionality)

$Pt^{0}$-$D^{v}_{4}$ catalyst solution: 0.01 g (50 ppm Pt, SIP 6832.0, Gelest)

As formulated, the above mixture gels over the course of ~15 minutes at room temperature. It is recognized that those skilled in the art could properly formulate such an addition cure silicone system to obtain a wide variety of curing profiles and material properties through judicious selection of catalysts, catalyst levels, inhibitors, and base vinylsiloxane and hydrosiloxane resins.

EXAMPLE 28

UV Curable Coating/Sealant Comprising Radial Hybrid Epoxy 2

A basic UV curable mixture was formulated as follows:

Formula 28-1: Radial Hybrid Epoxy 2: 8.0 g

CHVE (ISP): 2.0 g

Rhodorsil 2074 (Rhodia): 0.1 g

Isopropylthioxanthone (ITX): 0.05 g

A five mil thick film (on PTFE-coated aluminum) was formed using a drawdown bar. The film was cured using a Dymax stationary UV curing unit (UVA dose~550 mJ/cm$^2$, 100 W mercury arc lamp) to yield a solid film which was removed from the PTFE-coated substrate. The moisture barrier properties of this film were measured using a Permatran 3/33 instrument (Mocon, Inc.) at 50° C. and 100% relative humidity. The film was found to exhibit a moisture permeability coefficient of 21.9 g.mil/100 $in^2$.24 h. Thus, the resin system of formulation 28-1 is a viable starting point for developing rapidly UV curable barrier coatings or sealants that do not require a subsequent thermal curing step.

EXAMPLE 29

Highly Filled UV Curable Coating/Sealant Utilizing Radial Hybrid Epoxy 2

The resin system described hereafter was blended with talc filler as follows:

Formula 29-1: Radial Hybrid Epoxy 2: 8.0 g

CHVE (ISP): 2.0 g 9380C iodonium salt photoinitiator (GE silicones): 0.2 g

FDC talc (Luzenac Americas): 6.7 g

This resin/filler system was mixed by hand, followed by two passes through a three roll mill to assure wet-out of the filler particles by the resin components. The formulation was briefly vacuum degassed (P~25 Torr). A five mil thick film (on PTFE-coated aluminum) was formed using a drawdown bar. The film was cured using a Dymax stationary UV curing unit (UVA dose~550 mJ/$cm^2$, 100 W mercury arc lamp) to yield a solid film which was removed from the PTFE-coated substrate. The moisture barrier properties of this film were measured using a Permatran 3/33 instrument (Mocon, Inc.) at 50° C. and 100% relative humidity. The film was found to exhibit a moisture permeability coefficient of 12.1 g.mil/100 $in^2$.24 h. The water vapor permeability of this basic formulation is of the same order as the advertised permeability of commercially available perimeter sealants for Organic Light Emitting Diode (OLED) devices. It is also notable that, due to the highly reactive nature of this resin system, the efficient UV cure of 5 mil, highly filled films is quite efficient.

EXAMPLE 30

Use of Hybrid Epoxy-Terminal Copolymers in Adhesive Compositions

The resin systems shown below were prepared in order to demonstrate the utility of the inventive hybrid epoxy resins in both UV cured and thermally cured adhesive applications.

Formula 30-1: Radial Hybrid Epoxy 2: 9.0 g

CHVE (ISP): 1.0 g 9380C iodonium salt photoinitiator (GE silicones): 0.2 g

Cabosil TS-720 (Cabot): 0.1 g

Formula 30-2: Epon 828: 10.0 g 9380C iodonium salt initiator: 0.2 g

Cabosil TS-720 (Cabot): 0.1 g

Both formulations were used to form an ~1 mil bondline between 4 mm×4 mm quartz die and borosilicate glass substrates. For each formulation, all samples were UV cured through the quartz glass die (~550 mJ/$cm^2$ UVA dose, Dymax stationary curing unit, 100 W Hg arc lamp). After this intial UV cure, half of the samples for both formulations were thermally annealed at 70° C. for 10 minutes, and the other half of the samples were thermally cured at 175° C. for 1 hour. The adhesive properties of the samples were evaluated using a Royce shear testing apparatus. Results of shear testing performed at room temperature are given in Table 5. Data reported is the average of four or more trials.

TABLE 5

| Shear Testing Data | | |
|---|---|---|
| Formulation | Shear Strength (kg) (cure: UV + 70° C./10 min) | Shear Strength (kg) (cure: UV + 175° C./1 h) |
| 30-1 (radial hybrid 2) | 12.3 | 44.6 |
| 30-2 (Epon 828) | 22.9 | 33.7 |

Formulation 30-2 may be taken as a control adhesive system based on the common epoxy base resin Epon 828 (essentially the diglycidyl ether of bisphenol A). From the data shown in Table 5, formulation 30-1 based on the radial hybrid epoxy resin 2 exhibits higher shear strength after UV curing and a brief annealing at 70° C. relative to the Epon 828 control. This is attributed to the rapid UV curing kinetics and conversion exhibited by hybrid epoxy 2 also described in previous examples. This rapid and relatively extensive UV cure allows good adhesive and cohesive strength to develop quickly in adhesives based on this or similar hybrid resins. As shown by the shear strength data collected after a thorough thermal cure at 175° C. for 1 hour, the Epon 828-based formulation 30-2 ultimately does exhibit higher shear strength than the hybrid epoxy-based formulation 30-1. Conversely, it is clear that the 30-1 formulation also develops very high shear strength after the longer thermal cure cycle, and that this level of shear strength is quite acceptable for a wide variety of adhesive applications.

We claim:

1. An epoxy-terminal organic/inorganic hybrid copolymer having the following structure:

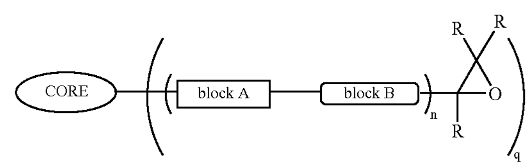

wherein n=1–100, q=4–20, CORE is an organic unit, block A is an inorganic unit selected from the group consisting of a silane unit, siloxane unit, or mixture thereof, block B is an organic unit, and R is alkyl or H and one or more R groups may be part of a cyclic structure.

2. The copolymer of claim 1, wherein q=3–6.

3. The copolymer of claim 1, wherein q=1–5.

4. The copolymer of claim 1, wherein CORE is derived from the group consisting of a hydrocarbon moiety with four or more unsaturated substituent groups.

5. The copolymer of claim 4, wherein CORE is derived from the group consisting of tetraallylbisphenol A; pentaerythritol tetraallyl ether; and mixtures thereof.

6. The copolymer of claim 1, wherein Block B consists of linear or branched alkyl units, linear or branched alkyl units containing heteroatoms, cycloalkyl units, cycloalkyl units containing heteroatoms, aromatic units, substituted aromatic units, heteroaromatic units, or mixtures thereof.

7. The copolymer of claim 6, wherein Block B is derived from the group consisting of 1,3-bis(alphamethyl)styrene; dicyclopentadiene; 1,4-divinyl benzene; 1,3-divinyl benzene; 5-vinyl-2-norbornene; 2,5-norbornadiene; vinylcyclohexene; 1,3-butadiene; 1,5-hexadiene; ethylene or mixtures thereof.

8. The copolymer of claim 1, wherein Block A is derived from the group consisting of 1,1,3,3-tetramethyldisiloxane;

1,1,3,3,5,5-hexamethyltrisiloxane; 1,1,3,3,5,5,7,7-octamethyltetrasiloxane; bis(dimethylsilyl)ethane (1,1,4,4-tetramethyldisilethylene); 1,4-bis(dimethylsilyl)benzene; 1,3-bis(dimethylsilyl)benzene; 1,2-bis(dimethylsilyl)benzene and mixtures thereof.

9. The copolymer of claim 1, wherein Block B is derived from the group consisting of diallyl ether, bisphenol A diallyl ether, 1,3-bis(alphamethyl)styrene; dicyclopentadiene; 1,4-divinyl benzene; 1,3-divinyl benzene; 5-vinyl-2-norbornene; 2,5-norbornadiene; vinylcyclohexene; 1,3-butadiene; 1,5-hexadiene; ethylene or mixtures thereof.

10. The copolymer of claim 1, wherein the epoxy end-groups are derived from the hydrosilation of an unsaturated epoxy compound.

11. The copolymer of claim 10, wherein the epoxy end-groups are derived from the group consisting of vinylcyclohexene oxide, allyl glycidyl ether, 3,4-epoxy butene, limonene mono-oxide or mixtures thereof.

12. A composition of matter comprising the copolymer of claim 1.

13. The composition of claim 12, wherein the composition is light curable, electron-beam curable or thermally curable.

14. The composition of claim 12, wherein the composition comprises an adhesive, sealant, coating, or sealant or encapsulant for an organic light emitting diode.

* * * * *